US009036915B2

(12) United States Patent  (10) Patent No.: US 9,036,915 B2
Quan et al.  (45) Date of Patent: May 19, 2015

(54) ARCHITECTURAL PATTERN DETECTION AND MODELING IN IMAGES

(75) Inventors: Long Quan, Hong Kong (CN); Peng Zhao, Hong Kong (CN)

(73) Assignee: The Hong Kong University of Science and Technology, Kowloon, Hong Kong ( * ) Notice: Subject to any disclaimer, the term of this patent is extended or adjusted under 35 U.S.C. 154(b) by 175 days.

(21) Appl. No.: 13/575,868

(22) PCT Filed: Jan. 27, 2011

(86) PCT No.: PCT/CN2011/000132
§ 371 (c)(1),
(2), (4) Date: Sep. 11, 2012

(87) PCT Pub. No.: WO2011/091717
PCT Pub. Date: Aug. 4, 2011

(65) Prior Publication Data
US 2013/0011069 A1  Jan. 10, 2013

Related U.S. Application Data

(60) Provisional application No. 61/282,370, filed on Jan. 29, 2010, provisional application No. 61/344,093, filed on May 21, 2010.

(51) Int. Cl.
G06K 9/62 (2006.01)
G06K 9/00 (2006.01)
G06F 17/30 (2006.01)

(52) U.S. Cl.
CPC ...... *G06K 9/00704* (2013.01); *G06F 17/30247* (2013.01)

(58) Field of Classification Search
CPC .. G06K 9/00704; G06T 15/04; G06T 15/205; G06T 17/00
USPC ................................................. 382/190, 225
See application file for complete search history.

(56) References Cited

U.S. PATENT DOCUMENTS 5,900,880 A  5/1999  Cline et al.
2007/0288876 A1  12/2007  Irmatov et al.

FOREIGN PATENT DOCUMENTS

CN  1764287  4/2006
CN  101158966  4/2008
CN  101556700  10/2009

OTHER PUBLICATIONS

Xiao et al: "Image-based façade modeling", ACM, 2008.*
Muller et al: "Image-based procedural modeling of facades", ACM, 2007.*
Lee et al: "Automatic integration of facade textures into 3D building models with a projective geometry based line clustering", Eurographics, 2002.*
International Search Report for PCT application No. PCT/CN2011/000132, dated May 5, 2011.

(Continued)

*Primary Examiner* — Ruiping Li
(74) *Attorney, Agent, or Firm* — Amin, Turocy & Watson, LLP

(57) ABSTRACT

Systems and methods are provided to facilitate architectural modeling. In one aspect, repetitive patterns are automatically detected and analyzed to generate modeled structural images such as building facades. In another aspect, structural symmetry is analyzed to facilitate architectural modeling and enhanced image generation.

20 Claims, 23 Drawing Sheets

(56) References Cited

OTHER PUBLICATIONS

Comaniciu, D., and Meer, P. 2002. Mean shift: a robust approach toward feature space analysis. IEEE Trans. on PAMI 24, 5, 603-619.
Debevec, P., Taylor, C., and Malik, J. 1996. Modeling and rendering architecture from photographs: a hybrid geometry- and image-based approach. In ACM Trans. Graph., 11-20.
Duda, R. O., and Hart, P. E. 1972. Use of the hough transformation to detect lines and curves in pictures. Commun. ACM 15, 1, 11-15.
Felzenszwalb, P., and Huttenlocher, D. 2004. Efficient graph-based image segmentation. IJCV 59, 2, 167-181.
Fruh, C., and Zakhor, A. 2003. Constructing 3d city models by merging ground-based and airborne views. In Proceedings of CVPR, vol. 2, 562-569.
Gool, L. V., Zeng, G., Den Borre, F. V., and Müller, p. 2007. Towards mass-produced building models. In Photogrammetric Image Analysis, 209-220.
Han, J., McKenna, S. J., and Wang, R. 2008. Regular texture analysis as statistical model selection. In Proceedings of ECCV, Springer-Verlag, Marseille, France, 242-255.
Harris, C., and Stephens, M. 1988. A combined corner and edge detector. In Alvey Vision Conference.
Hays, J., Leordeanu, M., Efros, A. A., and Liu, Y. 2006. Discovering texture regularity as a higher-order correspondence problem. In Proceedings of ECCV, 522-535.
Jiang, N., Tan, P., and Cheong, L.-F. 2009. Symmetric architecture modeling with a single image. ACM Trans. Graph., 1-8.
Koran, T., and Rasmussen, C. 2008. Analysis of building textures for reconstructing partially occluded facades. In Proceedings of ECCV.
Lee, S., and Liu, Y. 2009. Curved glide-reflection symmetry detection. In Proceedings of CVPR.
Lee, S., and Liu, Y. 2009. Skewed rotation symmetry group detection. IEEE Trans. on PAMI.
Lee, S., Collins, R., and Liu, Y. 2008. Rotation symmetry group detection via frequency analysis of frieze-expansions. In Proceedings of CVPR.
Leung, T. K, and Malik, J. 1996. Detecting, localizing and grouping repeated scene elements from an image. In Proceedings of ECCV, 546-555.
Lin, W., and Liu, Y. 2007. A lattice-based mrf model for dynamic near-regular texture tracking. IEEE Trans. on PAMI 29, 5, 777-792.
Lin, H.-C., Wang, L.-L., and Yang, S.-N. 1997. Extracting periodicity of a regular texture based on autocorrelation functions. Pattern Recognition Letter 18, 5, 433-443.
Liu, Y., Collins, R., and Tsin, Y. 2004. A computational model for periodic pattern perception based on frieze and wallpaper groups. IEEE Trans. on PAMI 26, 3, 354-371.
Liu, Y., Lin, W.-C., and Hays, J. H. 2004. Near regular texture analysis and manipulation. ACM Trans. Graph. 23, 1 (Aug.), 368-376.
Liu, Y., Tsin, Y., and Lin, W.-C. 2005. The promise and perils of near-regular texture. IJCV 62, 1 (Apr.), 145-159.
Lowe, D. G. 1999. Object recognition from local scale-invariant features. In Proceedings of ICCV, IEEE Computer Society, 1150.
Loy, G., and Eklundh, J.-O. 2006. Detecting symmetry and symmetric constellations of features. In Proceedings of ECCV.
Mitra, N. J., Guibas, L. J., and Pauly, M. 2006. Partial and approximate symmetry detection for 3d geometry. ACM Trans. Graph. 25, 3, 560-568.
Mitra, N. J., Guibas, L. J., and Pauly, M. 2007. Symmetrization. ACM Trans. Graph., 63.
Mortensen, E. N., and Barrett, W. A. 1995. Intelligent scissors for image composition. ACM Trans. Graph., 191-198.
Muller, P., Wonka, P., Haegler, S., Ulmer, A., and Gool, L. V. 2006. Procedural modeling of buildings. ACM Trans. Graph. 25, 3 (Aug.), 614-623.
Muller, P., Zeng, G., Wonka, P., and Gool, L. V. 2007. Image-based procedural modeling of facades. ACM Trans. Graph., 85:1-85:10.
Nan, L., Sharf, A., Zhang, H., Cohen-Or, D., and Chen, B. 2010. Smartboxes for interactive urban reconstruction. ACM Trans. Graph. 29, 3.
Oh, B. M., Chen, M., Dorsey, J., and Durand, F. 2001. Image-based modeling and photo editing. ACM Trans. Graph. 1, 433-442.
Park, M., Lee, S., Chen, P.-C., Kashyap, S., Butt, A. A., and Liu, Y. 2008. Performance evaluation of state-of-the-art discrete symmetry detection algorithms. In Proceedings of CVPR.
Pauly, M., Mitra, N. J., Wallner, J., Pottmann, H., and Guibas, L. J. 2008. Discovering structural regularity in 3D geometry. ACM Trans. Graph. (Aug.), 43:1-43:11.
Pollefeys, M., Nister, D., Frahm, J.-M., Akbarzadeh, A., Mordohai, P., Clipp, B., Engels, C., Gallup, D., Kim, S.-J., Merrell, P., Salmi, C., Sinha, S., Talton, B., Wang, L., Yang, Q., Stew'enius, H., Yang, R., Welch, G., and Towles, H. 2007. Detailed real-time urban 3d reconstruction from video. IJCV 78, 2-3, 143-167.
Prusinkiewicz, P., and Lindenmayer, A. 1990. The Algorithmic Beauty of Plants. Springer-Verlag, New York.
Rother, C., Kolmogorov, V., and Blake, A. 2004. "grabcut": interactive foreground extraction using iterated graph cuts. ACM Trans. Graph. 23, 3 (Aug.), 309-314.
Schaffalitzky, Zisserman, Schaffalitzky, F., and Zisserman, A. 1998. Geometric grouping of repeated elements within images. Proceedings of BMVC, 13-22.
Schindler, G., Krishnamurthy, P., Lublinerman, R., Liu, Y., and Dellaert, F. 2008. Detecting and matching repeated patterns for automatic geo-tagging in urban environments. In Proceedings of CVPR.
Stava, O., Benes, B., Mech, R., Aliaga, D., and Kristof, P. 2010. Inverse procedural modeling by automatic generation of I-systems. Computer Graphics Forum 29, 2, 10.
Tan, P., Fang, T., Xiao, J., Zhao, P., and Quan, L. 2008. Single image tree modeling. ACM Trans. Graph. 27, 5 (Dec.), 108:1-108:7.
Van Den Hengel, A., Dick, A., Thormhlen, T., Ward, B., and Torr, P. H. S. 2007. Videotrace: rapid interactive scene modelling from video. ACM Trans. Graph., 86.
Wonka, P., Wimmer, M., Sillion, F., and Ribarsky, W. 2003. Instant architecture. ACM Trans. Graph. 3, 3 (Aug.), 669-677.
Xiao, J., Fang, T., Tan, P., Zhao, P., Ofek, E., and Quan, L. 2008. Image-based facade modeling. ACM Trans. Graph. 27, 5 (Dec.), 161:1-161:10.
Xiao, J., Fang, T., Zhao, P., Lhuillier, M., and Quan, L. 2009. Image-based street-side city modeling. ACM Trans. Graph. 28, 5 (Dec.), 114:1-114:12.

* cited by examiner

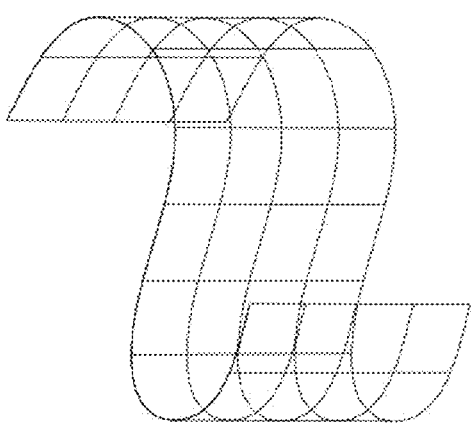
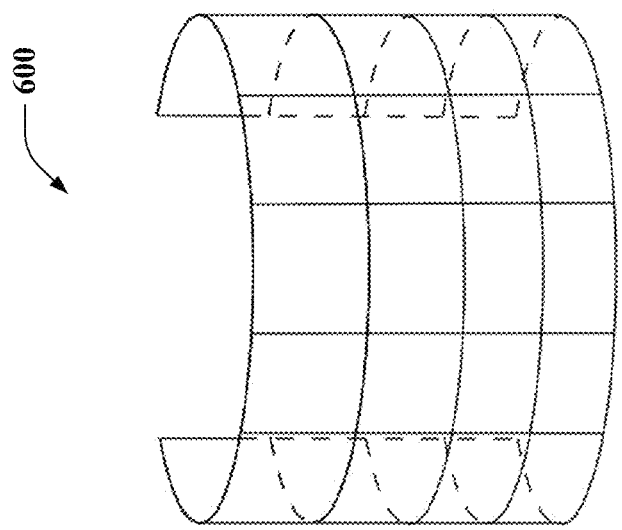
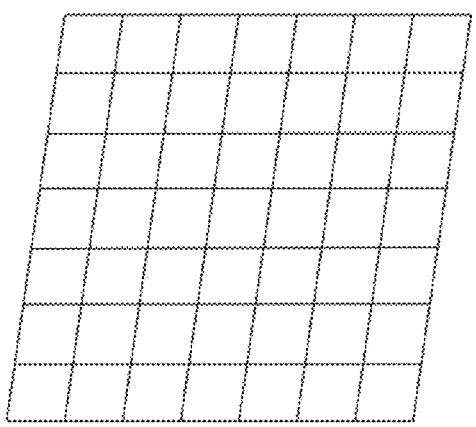
FIG. 6

ARCHITECTURAL PATTERN DETECTION AND MODELING IN IMAGES

CROSS-REFERENCE TO RELATED APPLICATIONS

This application is a U.S. National Stage of PCT Patent Application No. PCT/CN2011/000132, filed Jan. 27, 2011 and entitled "ARCHITECTURAL PATTERN DETECTION AND MODELING IN IMAGES"; which claims priority to U.S. Provisional Patent Application No. 61/282,370, filed Jan. 29, 2010 and entitled "DETECTION METHOD OF REPETITIVE PATTERNS IN IMAGES"; and which also claims priority to U.S. Provisional Patent Application 61/344,093, filed May 21, 2010 and entitled "METHOD OF FACADE SYMMETRY DETECTION AND MODELING IN IMAGES". The entireties of the above-referenced applications are incorporated herein by reference.

TECHNICAL FIELD

The subject disclosure relates generally to computer modeling and, more particularly, to applications where repetitive patterns and structural symmetry are detected and modeled to more accurately visualize architectural structures.

BACKGROUND

There is an increasing demand for photo-realistic modeling of buildings and cities for applications including three-dimensional ("3D") map services, games, and movies. The modeling of buildings and cities often reduces de facto to that of building facades. The current state of the art ranges from pure synthetic methods based on grammar rules and 3D scanning of street facades, to image-based approaches which utilize either small or large numbers of images. This includes the problem of detecting translational repetitive patterns in an orthographic image, where there have been several methods for regularity or symmetry analysis. These include Hough-transform like methods, varying in the manner on how to sample data space and where to vote. A recent framework discovers structural regularity in 3D geometry using discrete groups of transformations, for example. The following provides a brief non-exhaustive discussion of architectural modeling techniques including symmetry detection, façade modeling, and inverse procedural modeling.

Symmetry in 3D techniques often employs a voting scheme in transformation space to detect partial and approximate symmetries of 3D shapes. These include symmetrization applications to discover structural regularity in 3D geometry using discrete groups of transformations. Another application provides a solution by manually creating models from 3D scanners and also relied on manually specifying symmetry patterns. Symmetry in images provides a computational model that detects peaks in an autocorrelation ("AC") function of images to determine the periodicity of texture patterns. One application mapped a 2D rotation symmetry problem to a Frieze detection problem and employed discrete Fourier transform for Frieze detection. Subsequently, a more general method to detect skewed symmetry was proposed.

Another modeling technique detected and grouped selected elements in a graph structure based on intensity variation. One method identified salient peaks using Gaussian filters to iteratively smooth the AC function, where translation vectors are determined by generalized Hough transforms. Another technique utilized edge detection to determine elements and successively grow patterns in a greedy manner, where a grouping strategy for translational grids based on maximum likelihood estimation. Yet another technique introduced a pair-wise local feature matching algorithm using key points at corresponding locations. One algorithm detects rotation symmetry centers and symmetry pattern from real images, but does not address all symmetry group properties. Another proposal was to test and find the optimal hypotheses using a statistical model comparison framework. There are also methods that analyze near-regularity detection.

Facade modeling includes image-based methods, where images are employed as guides to interactively generate models of architectures. Many vision-based methods require registered multiple images. One algorithm for structure detection in building facades utilized a strong prior knowledge regarding facade structures to detect translational repetitive windows. Another technique relaxed the input image to process strong perspectives, where repeated point features are grouped using chain-wise similarity measurements. Yet another technique employed a priori knowledge regarding grid patterns on building facades which is formulated as Markov Random Field and discovered by Markov Chain Monte Carlo optimization.

Another method utilizes a variation of RANSAC-based planar grouping method to detect perspectively distorted lattices of feature points which allows identification of the main translation vectors of the underlying repeated wallpaper pattern. An interactive system was employed to create a model from a single image by manually assigning the depth based on a painting metaphor. Another system used a sketching approach in one or more images, where yet another system interactively recovered a 3D texture-mapped architecture model from a single image by employing constraints derived from shape symmetries.

Inverse procedural modeling includes L-system approaches for plant modeling which is perhaps the most representative of procedural approaches. Inverse modeling from images to extract rules is also provided for tree modeling. For architecture modeling, Computer Generated Architecture ("CGA") shape software combined a set grammar with a split rule and produced detailed building geometries. Although the design of grammar systems has been utilized, there is limited work on how to extract grammars from existing models as inverse modeling. One grammar extraction method uses a top-down partition scheme to extract split rules from a rectified facade image. However, extracted grammar rules are limited to grid-like subdivisions. Recent approaches on inverse procedural modeling recognize a vector picture and employ extracted rules to re-synthesize new pictures.

The above-described deficiencies of today's 3D modeling are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary in order to provide a basic understanding of some aspects disclosed herein. This summary is not an extensive overview. It is intended to neither identify key or critical elements nor delineate the scope of the aspects disclosed. Its sole purpose is to present some concepts in a simplified form as a prelude to the more detailed description that is presented later.

Systems and methods are provided to detect repetitive patterns and symmetry patterns in images to facilitate architectural modeling. In one aspect, a method is provided that includes extracting initial sample portions from images as potential repetitive patterns. The method includes retaining selected patterns from the potential repetitive patterns that are determined to be actual repetitive patterns. This includes clustering the actual repetitive patterns from sub-group domains into aggregated group domains by using information from a transformation domain and a spatial domain. The method also includes extracting one or more shapes for the actual repetitive patterns based in part on the information from the transformation domain and the spatial domain.

In another aspect, a system is provided that includes a detector to determine sampling points in an image and to generate similarity maps for the sampling points. The system includes a cluster component to determine image lattices and transform lattices within the image in order to determine multiple repetitive patterns of arbitrary shapes. A rectangular analyzer determines regions of interest for non-repetitive patterns within the image and a façade layout component generates a set of disjoint structure regions to facilitate symmetry detection within the image.

In yet another aspect, a tangible computer-readable medium is provided. The computer-readable medium includes instructions for determining selected patterns from potential repetitive patterns and clustering the selected patterns as actual repetitive patterns from a first domain into at least one other domain by utilizing information from a transformation domain and a spatial domain. This includes instructions for extracting one or more shapes for the actual repetitive patterns based in part on the information from the transformation domain and the spatial domain. This also includes instructions for determining sampling points in an image and to generate similarity maps for the sampling points and instructions for determining image lattices and transform lattices within the image in order to determine one or more symmetry patterns. The computer-readable medium also includes instructions for generating a set of disjoint structure regions to facilitate symmetry detection within the image based in part on the one or more symmetry patterns.

To the accomplishment of the foregoing and related ends, the subject disclosure then, comprises the features hereinafter fully described. The following description and the annexed drawings set forth in detail certain illustrative aspects. However, these aspects are indicative of but a few of the various ways in which the principles disclosed herein may be employed. Other aspects, advantages and novel features will become apparent from the following detailed description when considered in conjunction with the drawings.

BRIEF DESCRIPTION OF DRAWINGS

FIG. 6 illustrates example surfaces that can be employed for detecting patterns.

DETAILED DESCRIPTION

Systems and methods are provided to facilitate architectural modeling. In one aspect, a detection system and method for repetitive patterns in orthographic texture images is provided. Given an input image, the method detects repetitive patterns in substantially any shape without prior knowledge on location, size, or shape of such patterns. This improves the performance of a city modeling system by enabling building facade analysis, for example, to be more robust and efficient than previous systems and methods. The systems and methods are automated and have been demonstrated on various scenarios and city-scale examples.

In another aspect, an automatic method of 3D modeling of building facades from images is provided. A facade symmetry detection component provides a fronto-parallel image, which automatically detects multiple repetitive patterns of arbitrary shapes without prior knowledge. An automated facade analysis detects and recognizes architectural elements, and generates a facade layout based on detected repetitive patterns and non-repetitive objects for creating 3D models of actual facades. An inverse procedural modeling of synthetical facades is also provided. Procedural rules of the facade model are learned from images of facades and then utilized to generate a synthetic facade 3D model.

As used in this application, the terms "component," "system," "model," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
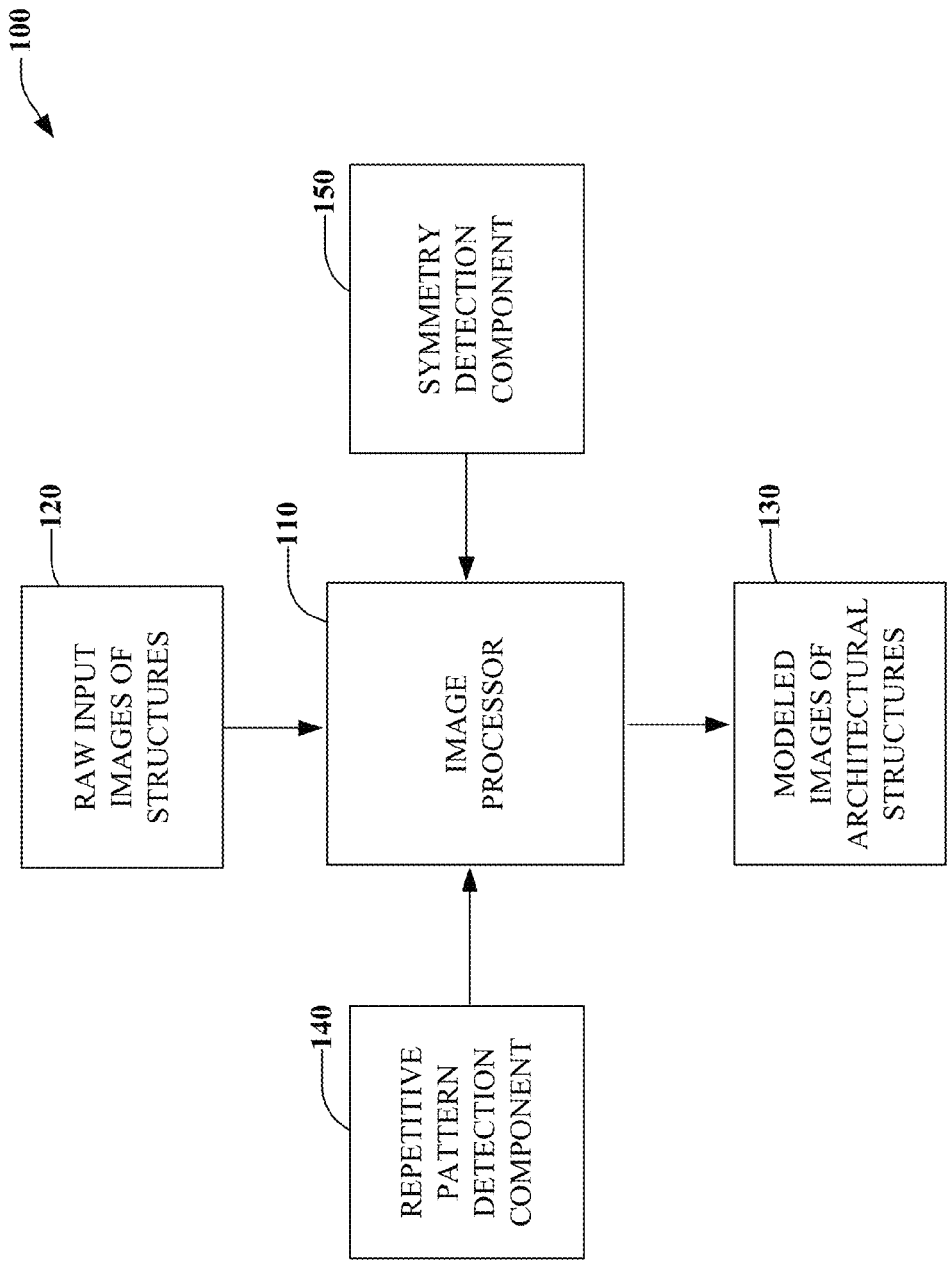
FIG. 1 is a schematic block diagram of a pattern-detection and modeling system.

Referring initially to FIG. 1, a pattern-detection and modeling system 100 is illustrated. The system 100 includes an image processor 110 that receives raw input images 120 and produces modeled images 130 of architectural structures (or shapes). To generate such images 130, various detection components are provided to enhance the quality thereof. The input images 120 can include overhead views of structures such as from satellite images or other views such as elevated or ground-level views (e.g., captured camera images) that are modeled to generate the images. Although not shown, the system 100 can include other computer components for executing the various system components including a tangible computer-readable medium to store instructions for the respective execution of the components and which is described in more detail below.

In one aspect, a repetitive pattern detection component 140 is provided to facilitate generation of the images 120 by the image processor 110. This includes a method that detects translational repetitiveness in an orthographic texture image of a building façade, for example. Due to restricted translational structures of interest and richness of texture information for similarity computation, the method facilitates efficiency and robustness (e.g., more accurate images, more immune to incomplete or corrupted input data). The repetitive pattern detection component 140 provides a suitable mapping from image space of similarity transformations to an auxiliary two-dimensional ("2D") space. This procedure can be followed by clustering of transformations yielding characteristic lattice patterns for shapes containing regular structures.

The repetitive pattern detection component 140 can include multiple stages of processing. For example, one stage samples and clusters sampling patches and accumulates the transformation among patches in transform space. Another stage estimates parameters of a generative model that produces image patterns and can be achieved by a global optimization procedure in transform space which is described in more detail below. Yet another stage of the detection component 140 can include aggregating small repetitive patterns into several large repetitive patterns and estimating the boundary of each repetitive pattern. Multiple types of repetitive patterns in difference sizes and shapes can be detected concurrently, wherein nested repetitive patterns can also be detected. Such systems and methods that execute the repetitive pattern component 140 can be employed for improving the performance of city modeling which require accurate facade analysis, for example. Various illustrations and examples of image-based city modeling are further described below.

In another imaging processing aspect of the system 100, a symmetry detection component 150 is provided to facilitate analysis of the input images 120. This includes an automatic method to reconstruct 3D facade models of high visual quality from a single image (or a cluster of images/fragments of images). In general, symmetry is one of the most characteristic features of architectural design which can be exploited for computer analysis. The symmetry detection component 150 includes a facade symmetry detection algorithm in a fronto-parallel image, which automatically detects multiple repetitive patterns of arbitrary shapes via a facade analysis algorithm. This includes detecting and recognizing architectural elements to generate a facade layout for 3D models of real facades. Also, an inverse procedural modeling of synthetic facades is provided by learning rules from facade images 120.

As noted, the input 120 includes a fronto-parallel image of a building facade. These images can be obtained in accordance with different procedures. For a single facade image, it can be rectified by using available methods. For a sequence of registered images, a true orthographic texture of the facade is composed automatically. Starting with a rectified fronto-parallel image of facades, the symmetry detection component 150 first detects Harris corner points to sample the image 120 and generate similarity maps for each of the sampling points. Through the construction of transform lattice in the space of pair-wise transformations, the component 150 clusters the image lattices and transforms lattices to obtain multiple repetitive patterns of arbitrary shapes. Then, rectangular regions of interest containing other architectural elements than the repetitive patterns are also detected. The facade layout is generated as a set of disjoint structure regions. Repetitive pattern and non-repetitive elements are recognized through a database of architectural objects for final modeling. A complete example illustrating the different steps of computation for the symmetry detection component 150 is shown in a sequence of images 200 of FIG. 2. Also, the component 150 converts the detected facade layout into procedural rules, which are then used to generate a synthetical facade.

The symmetry detection component 150 provides an integration of image-based and rule-based methods. These include developing a robust and efficient detection of repetitive patterns in facade texture images; developing an efficient and accurate facade analysis method based on the detection and recognition of repetitive patterns and non-repetitive architectural elements; and improving CGA shape grammar for buildings by introducing contain rules that overcome the weakness of the previous split rules for buildings. These grammar rules can be utilized to synthesize a synthetic but realistic facade.

Before proceeding it is noted that the system 100 will be described in conjunction with various drawings that follow where the drawings illustrate one or more example aspects to the image-generating capabilities of the system. From time-to-time during the discussion, subsequent drawings may be discussed in context of the general system drawing shown in FIG. 1.

Figure 2:
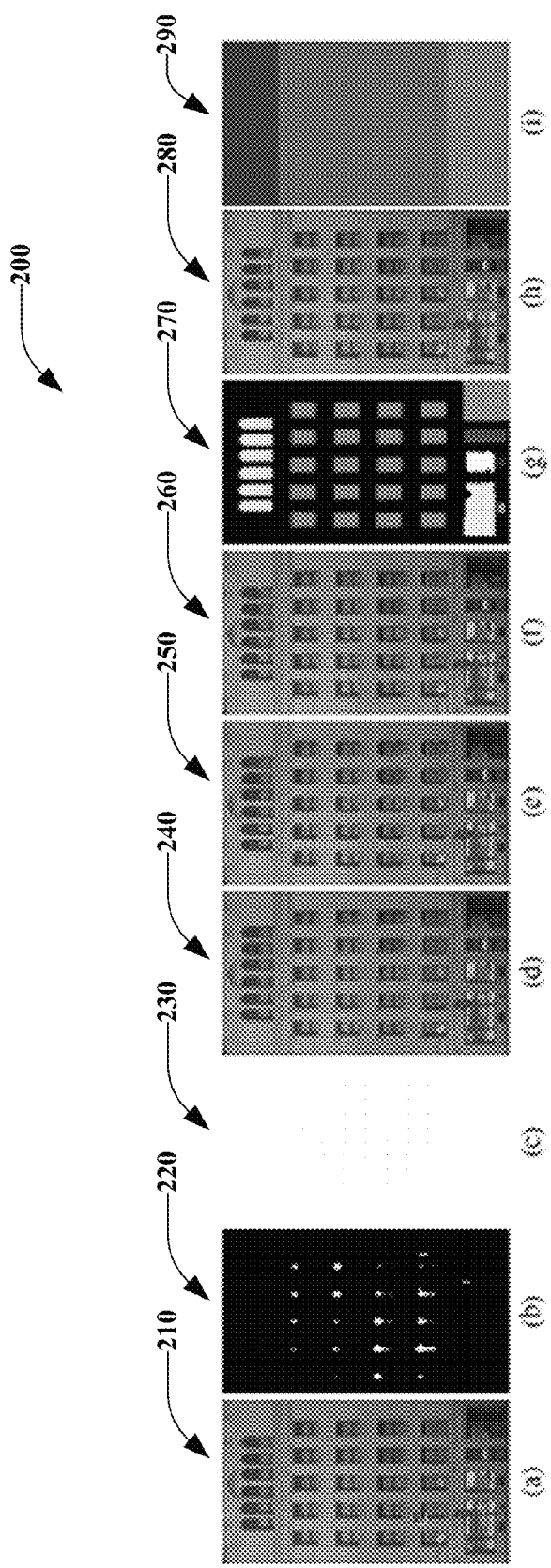
FIG. 2 is a diagram of a method for detecting pattern sequences for recognition of patterns and façade modeling.

Referring briefly to FIG. 2, a sequence of images 200 is provided to illustrate an example pattern detection method described above with respect to FIG. 1. At 210, Harris points (e.g., represented as red crosses) are determined as seed sample points. At 220, a thresholded similarity map for a given seed sample e.g., marked in a box (or other shape) in the image 210, wherein potential similar points of a given seed sample point are a type of local maxima points displayed in red dots (or other indicia). At 230, a transform lattice fitting in transformation space for the given seed sample point is determined. At 240, a recovered lattice in image space from the respective transform lattice for a given pre-determined seed sample point. At 250, color-coded sets of similar points from different seed sample points are determined. At 260, two top-ranked (could be other number than two) repetitive patterns with a grouping of sample points is selected. At 270, detection of repetitive patterns and non-repetitive objects is illustrated, where recognition of patterns and objects is shown for example at 280 and an example facade layout is shown at 290. Before proceeding, it is noted that the following description relates generally to repetitive pattern detection and symmetry detection, where concepts relating to repetitive pattern detection is described in FIGS. 3-13 and concepts relating to pattern detection are described in relation to FIGS. 14-21, respectively.

Figure 3:
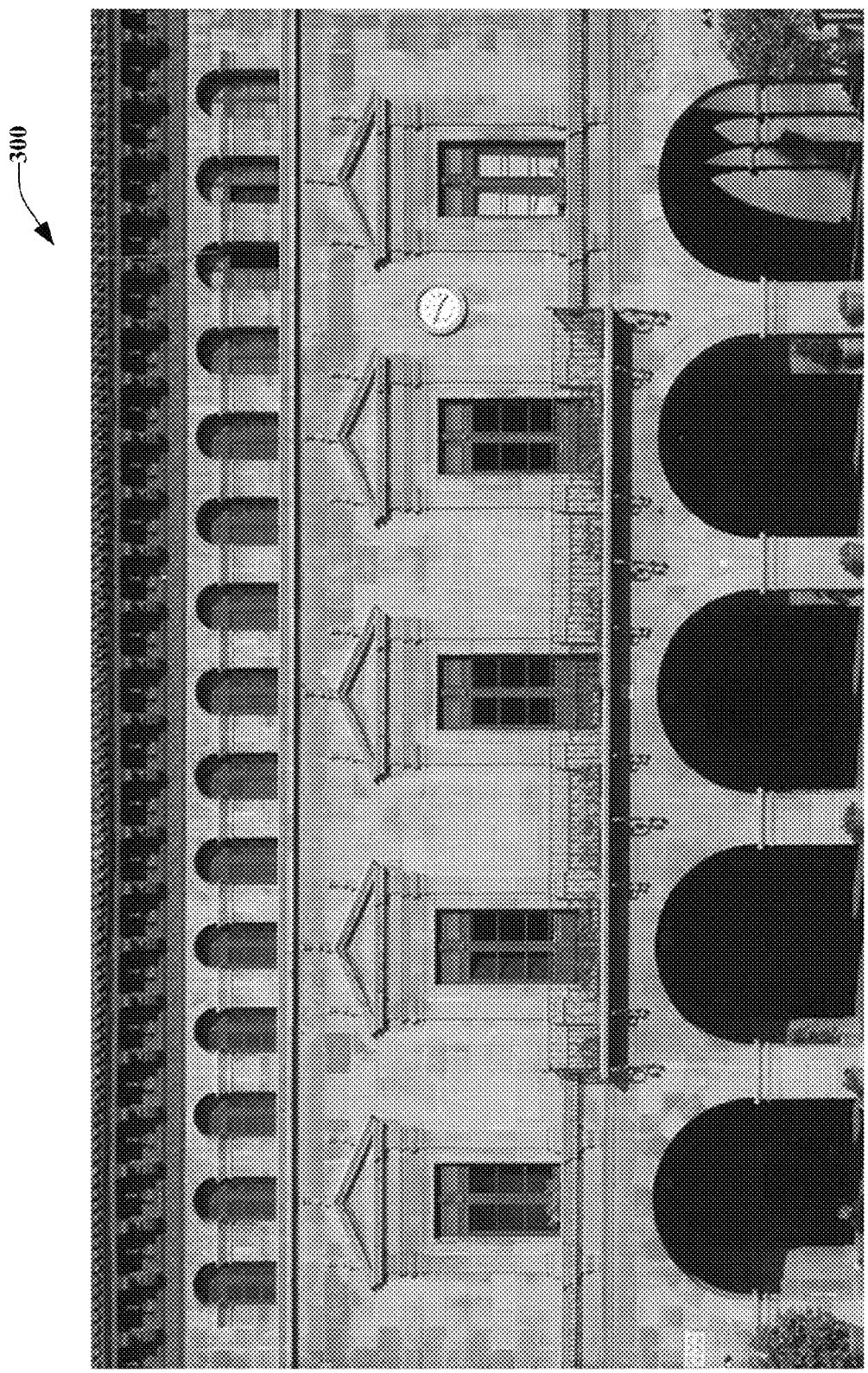
FIG. 3 is an ortho-rectified image of an example input for a repetitive pattern detection algorithm or component.

FIG. 3 is an ortho-rectified image 300 of an example input for a repetitive pattern detection algorithm or component. The image 300 can be employed as standard input of to a detection algorithm or component as noted above. It is noted that a non-rectified image or image sequence may also be utilized as input. If the input is a single image of urban environment without rectification for example, it can be rectified (processed for a desired image quality or parameter) before performing repetitive pattern detection. A building usually includes several facades or a facade with a large span, which generally cannot be captured in a single image as shown at 400 of FIG. 4. In this example, image sequence is used as input, and the ortho-rectified image on the facade plane is composed by fetching texture from multiple views as shown at 500 of FIG. 5.

Figure 4:
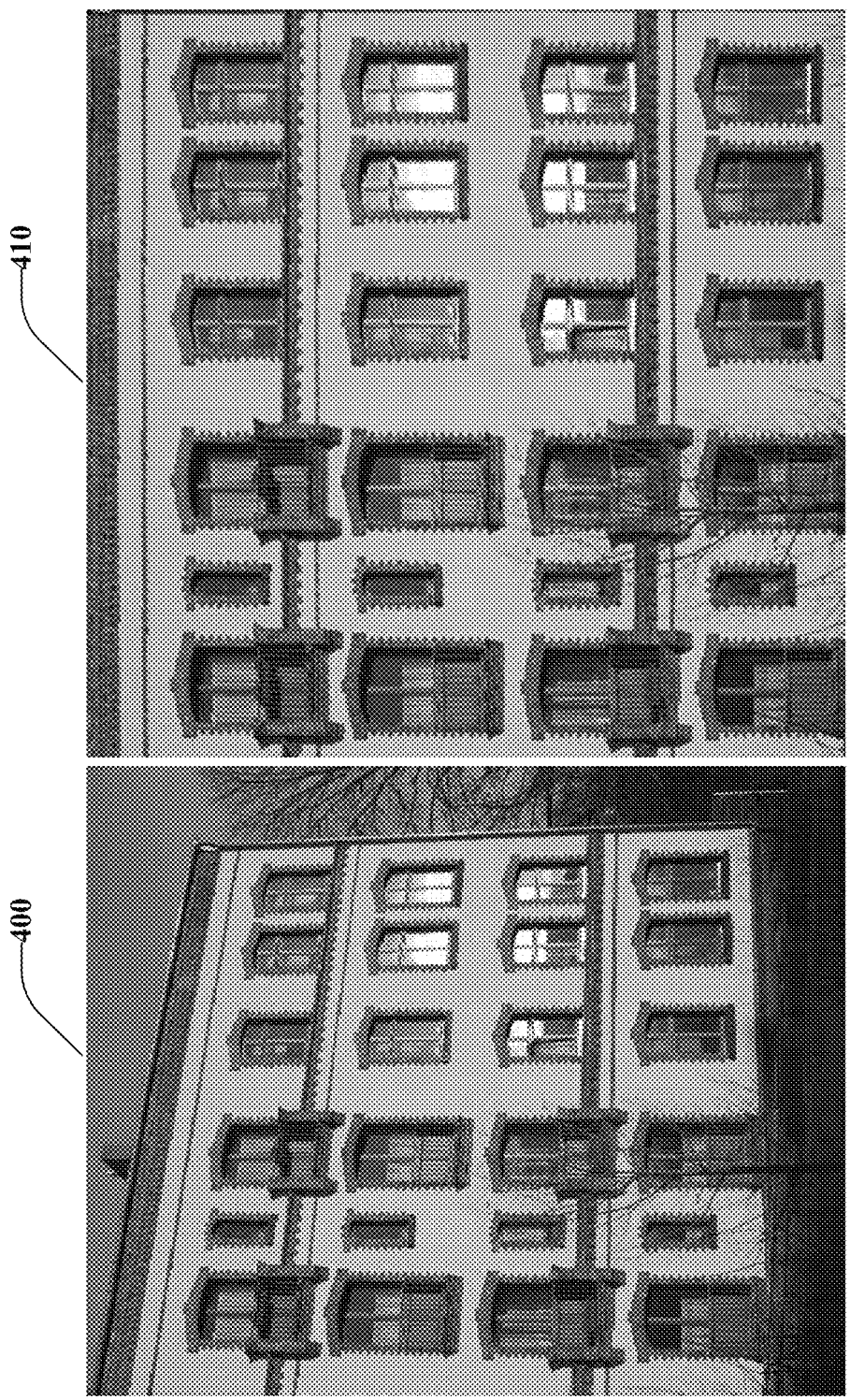
FIG. 4 illustrates an example of image rectification.
Figure 5:
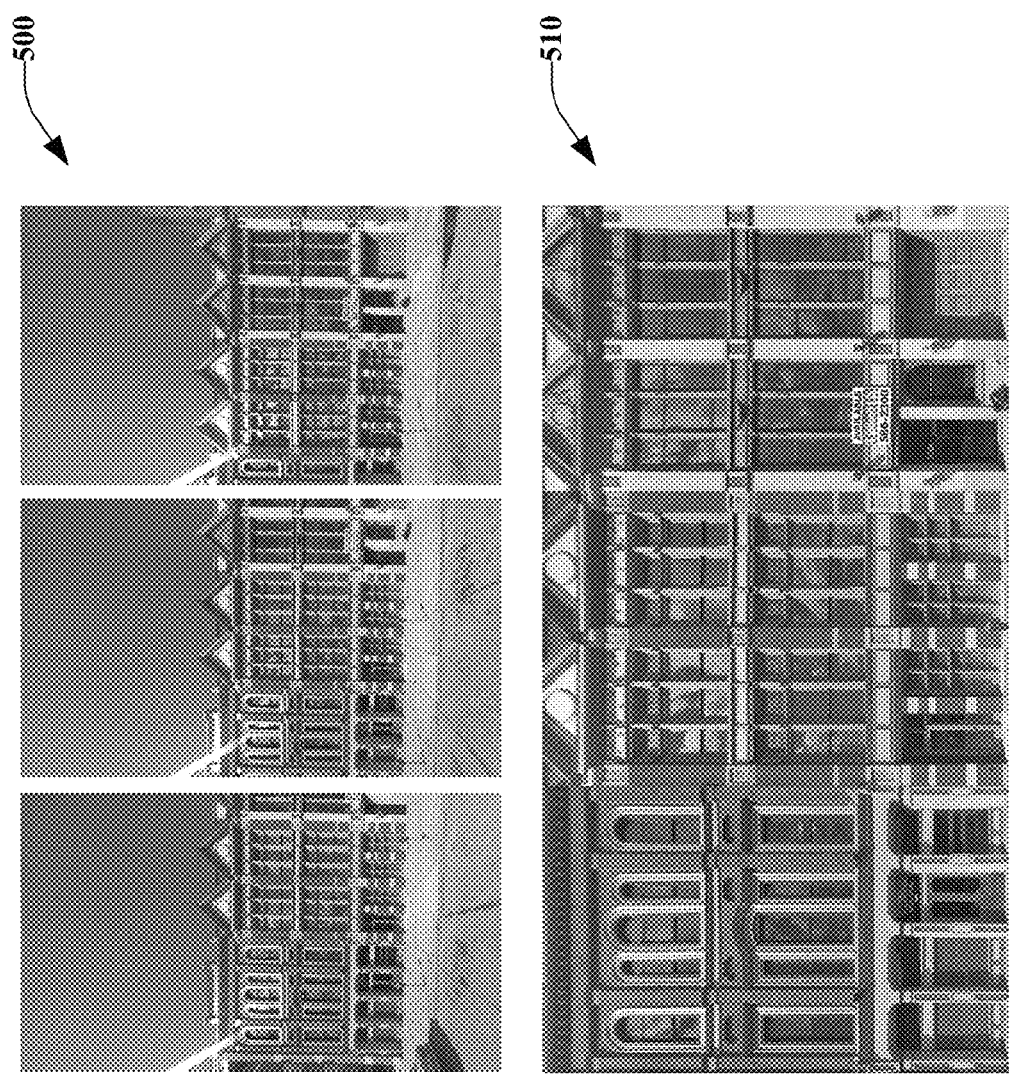
FIG. 5 illustrates an example of composed orthographic textures from input sequences.

If the input is a single facade image such as the example 400 of FIG. 4 which can be downloaded from web for example, a first act is to rectify the respective image into an ortho-rectified image. One example of the rectification is as follows. First, the gradient operator for each pixel in the image is computed. The argument and magnitude of the resulting gradient vector indicate the orientation and reliability of a local edge respectively. Then, a Hough linear transformation is applied on these potential edges. Since lines are mapped into points in the Hough space, reliable lines have strong corresponding points and a set of lines can be automatically detected. Finally, the horizontal and vertical vanishing points are extracted by a RANSAC optimization based on these lines. The 2D projective transformation that transfers these two vanishing points into infinite points can be employed to rectify the input image. The rectified image is shown at 410 of FIG. 4.

When the input is an image sequence, the orthographic texture can be composed from multiple views. The following method can be used for the texture composition. The image sequence is first reconstructed using a structure from motion ("SFM") algorithm to produce a set of semi-dense points and camera poses. Then, the reconstruction is partitioned into buildings and locally adjusted. After that, for each building, obtain at least one reference plane. An inverse patch-based orthographic composition method is employed for facade modeling that efficiently composes a true orthographic texture of the building facade. As shown at 500 of FIG. 5, an example input image sequence is provided whereas at 510 of FIG. 5, the composed orthographic texture on the reference plane is illustrated. Furthermore, not only a reference plane, an arbitrary developable surface can be employed as an initial surface for texture composition as shown in the example 600 of FIG. 6.

Figure 7:
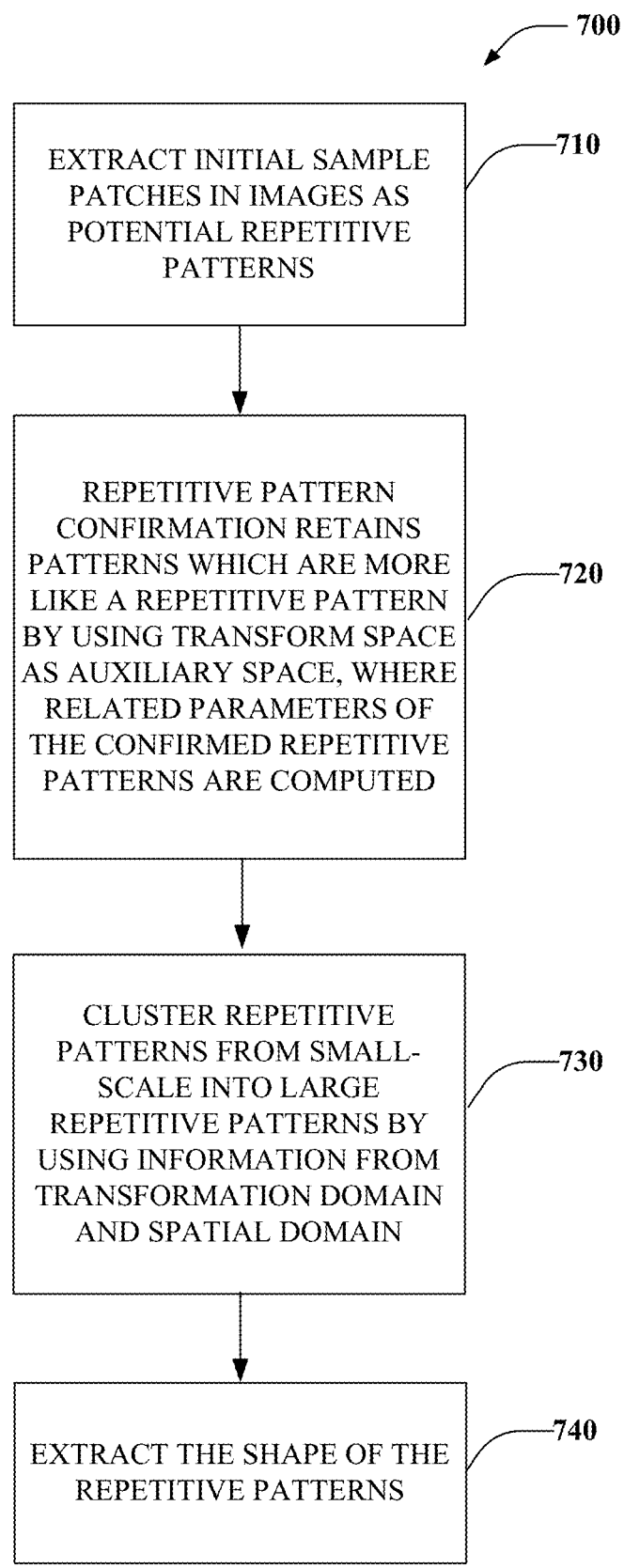
FIG. 7 is a flow chart illustrating an example repetitive pattern detection process for architectural modeling.

FIG. 7 illustrates a repetitive pattern detection process 700. In view of the example systems and components described above, example methodologies can be implemented in accordance with the disclosed subject matter and can be better appreciated with reference to flowcharts described herein. For purposes of simplicity of explanation example methods are presented and described as a series of acts; however, it is to be understood and appreciated that the various embodiments are not limited by the order of acts, as some acts may occur in different orders and/or concurrently with other acts from that shown and described herein. For example, those skilled in the art will understand and appreciate that a methodology could alternatively be represented as a series of inter-related states or events, such as in a state diagram, or interaction diagram. Moreover, not all illustrated acts may be required to implement a methodology in accordance with the subject specification. Additionally, it should be further appreciated that the methodologies disclosed hereinafter and throughout this specification are capable of being stored on an article of manufacture to facilitate transporting and transferring such methodologies to computers for execution by a processor or for storage in a memory.

In this aspect, the method 700 is employed to determine repetitive structure elements in ortho-rectified images, for example. At 710, extract initial sample patches in an image (or images) as potential repetitive patterns. At 720, the repetitive pattern confirmation process retains the patterns which are more like a repetitive pattern by using transform space as auxiliary space. The related parameters of the confirmed repetitive patterns are also computed. At 730, the repetitive patterns in small-scale are clustered into large repetitive patterns by using information from transformation domain and spatial domain. At 740, the shape of the repetitive patterns can be extracted.

The following descriptions and drawings are now discussed in support of the method 700. As noted, extract sampling points at 710, for instance, utilizing Harris corners in the texture image as sampling points of the entire facade texture. Harris corners are suitable for sampling because of the proven stability in detection. For each sampling point, compute a similarity map between a patch of width w centered at the corner point and each pixel in the texture, using a similarity measurement such as the sum of squared difference (SSD). Using a mode seeking method, e.g., a mean-shift method, locate stationary points of the similarity map from the modes of the density map. These stationary points are potential similar points of the sampling point.

Employ the pairs of the stationary points and the sampling point, and for each pair (or substantially each pair), compute a translation and map it onto a 2D plane, which is the transform space of 2D translations. This 2D transform space can be represented by a 2D array as an accumulator to receive the computed translations from the pairs. A mode seeking method such as the mean-shift can used to compute the mode points, which are used to fit a rectangular grid referred to as a lattice through the origin of the transform space. Estimate the nx and ny, which is the number of points on the lattice along x-axis and y-axis, respectively. The nx and ny restrict the boundary of the lattice fitting. Since the pixel position can be approximately quantized, the transform space is also approximately quantized. A search is performed to estimate the nx and ny in the neighborhood around the point presenting identity transformation. The initial gx and gy are computed along with nx and ny. Then, the gx and gy can be further optimized by searching a suitable fitting lattice in continuous value space. The search space may be restricted by the initial values of gx and gy. The stationary points whose translations with the sampling point are on the fitted lattice are retained as the set of similar points SGc, to which the sampling points can also be added.

Compute the bounding box of the similar points, and construct a grid in the image space. Note that the term grid is used in image space and a lattice in transform space. If the number of the similar points on the constructed grid is larger than a threshold, e.g., 90% of all the similar points, the grid is confirmed for the given sampling point. Each sampling point thus yields a potential grid in image space through a lattice in transform space, where similar computations can be performed for all sampling points in order to obtain many confirmed grids.

The lattice estimation stage operates in transform space and a set of regular structures at the scale of the initial image patches are extracted. Merge the extracted small repetitive regions into large-scale repetitive regions and find the optimal transformation for each large-scale repetitive region. To achieve this, classify the lattices into several groups. Then, further classify each group into sub-groups according to the spatial information of the grids. Apply segmentation on the region of each sub-group and retrieve the estimated shape of the foreground object for each sub-group. The segmentation in the spatial domain is essentially to deal with the inaccuracy of the estimated transformations from the small image patches.

As noted, classify the lattices into several groups. Each lattice l has a elementary translation El denoted as glx×gly, where gx and gy indicate the elementary translation along x-axis and y-axis, respectively. The elementary translation El is the abstraction of each pair of grid and lattice and is useful to distinguish different repetitive patterns. Thus, the lattices are grouped according to the elementary translation by using a clustering algorithm, e.g., a hierarchical clustering algorithm. Thus, define the distance between two lattices and the inter-cluster distance. There are several methods to compute the distance between two lattices l1 and l2. For example, the distance between two lattices l1 and l2 can be defined as the L2-Norm of El1 and El2. To define the inter-cluster distance, there may be many measurements. For example, the inter-cluster measurement between two clusters Ci and Cj can be defined as:

$$D_{inter}(C_i,C_j) = \alpha \text{Min}(C_i,C_j) + (1-\alpha)\text{Max}(C_i,C_j) \quad \text{Equation 1:}$$

where Min($C_i$, $C_j$), Min($C_i$, $C_j$) and α are the nearest neighbor rule, furthest neighbor rule and the control factor in [0, 1], respectively. The neighboring clusters with smaller inter-cluster distance, is more likely to be merged. In the merging process, the larger favors the merging of smaller clusters and smaller favors the merging of larger clusters.

In spatial domain, different repetitive patterns can have similar elementary translations. Additionally, one-one correspondences between grids and lattices can be determined. Thus, classify each grid group into sub-groups in spatial domain. A distance DG is defined as the distance between two grids. One process to define the DG is as follows. For each confirmed grid Gc, a bounding box Gc is defined as the minimum rectangle region that contains its similar points SGc. Thus, the missing grid points $M_{G_c}^{\beta G_c}$ in the bounding box Gc can be computed. Thus, define the distance between two grids Gi and Gj as:

$$D_G(G_i, G_j) = \frac{\sum_{s_x \in S_{G_i}, m_x \in M_{G_i}} \beta_{G_i} \cup \beta_{G_j} D_p(s_x, m_x)}{|S_{G_i}|} + \frac{\sum_{s_y \in S_{G_j}, m_y \in M_{G_j}} \beta_{G_i} \cup \beta_{G_j} D_p(s_y, m_y)}{|S_{G_j}|} \quad \text{Equation 2}$$

where Dp computes the distance between two patches, e.g., the SSD. Therefore, compute the distances between each pair of confirmed grids. Then, another clustering process is employed to classify small repetitive patterns into repetitive pattern groups.

In each repetitive pattern group, similar points from different grids but belonging to the same grid position are grouped together, and its centroid computed. A tile centered at the centroid with the same size as the cell of the lattice in transform space is constructed. Such a rectangular tile is expected to contain one individual element of the repetitive pattern. Use a segmentation method, for instance the "GrabCut," within the tile to segment foreground out of the background wall as the architecture element. Then, the median of the foreground segments of the same type is determined as the representative shape of the architecture element.

The boundaries of the detected repetitive elements are noised arbitrary contours. Match each of these recovered elements against a set of predefined generic templates. Set up a template database T, in which each template t ∈ 𝒯 has a Type, windows or doors for instances, and a shape st, parametrized by its bounding box.

Select the potential matching by the bounding boxes of the element and the template. Then compute a score as:

$$\text{score} = \frac{D(s_t, r_{sa})}{B(s_t)} \text{ for } s_t \text{ and } r_{sa}, \text{ where} \quad \text{Equation 3}$$

$$D(s_t, r_{sa}) = s_t \cup r_{sa} - s_t \cap r_{sa}$$

which is the difference of the binary mask of st and rsa and B(st) is the length of the boundary of st measured in pixels. The match is established for the pair having the highest score. The position of the template t is refined by searching around a small neighbor to snap it to the positions where the edge response is the strongest. Moreover, a set of 3D models can be associated with each template t, so in order to search the most similar 3D model from a 3D template database.

Figure 8:
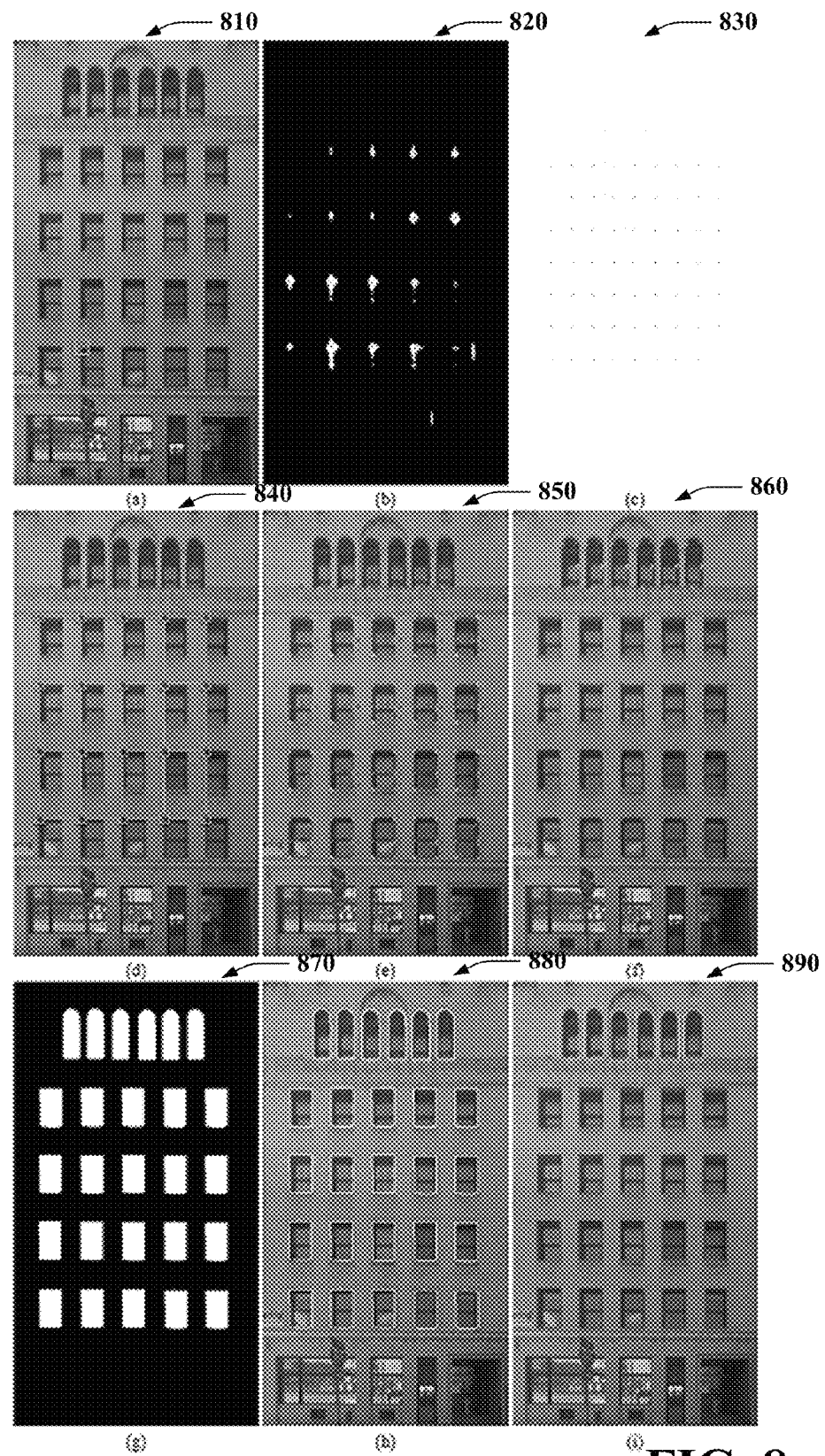
FIG. 8 illustrates an example workflow of images for repetitive pattern detection.

One example is shown in FIG. 8 where a recomposed orthographic texture image is employed to demonstrate the above described processes. At 810, Harris points are determined as sampling points. At 820, a thresholded similarity map for a given sampling point is determined. The potential similar points are a type of local maxima points. At 830, lattice fitting in transform space for the given sampling point is illustrated. At 840, the grid in image space that is converted from lattice pattern in transform space for the given sampling point is illustrated. At 850, the sets of similar points from different sampling points are illustrated. At 860, the two top ranked grids for the two repetitive patterns are selected. At 870, the binary segmentation of repetitive elements is illustrated. At 880, the rough contours of the irregular elements are determined. At 890, regularized elements after shape analysis are illustrated.

Figure 9:
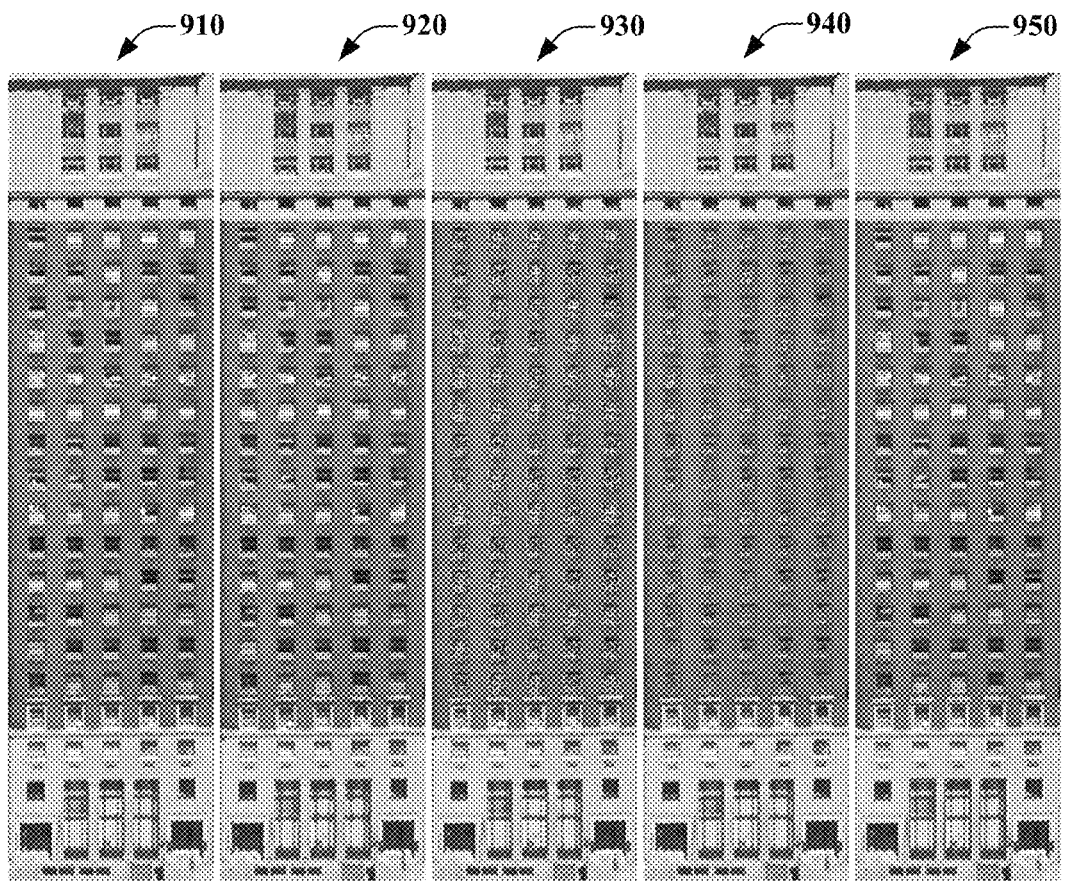
FIG. 9 illustrates another example workflow of images for repetitive pattern detection.

FIG. 9 is another example to show process workflow. At 910, the input image is shown as a facade texture in low resolution from aerial view. At 920, the sampling points are illustrated. At 930, confirmed grids are determined where points belonging to the same grid are represented in similar shades of gray. At 940, the result of repetitive patterns clustering is illustrated where the pattern extraction result is shown at 950.

Figure 10:
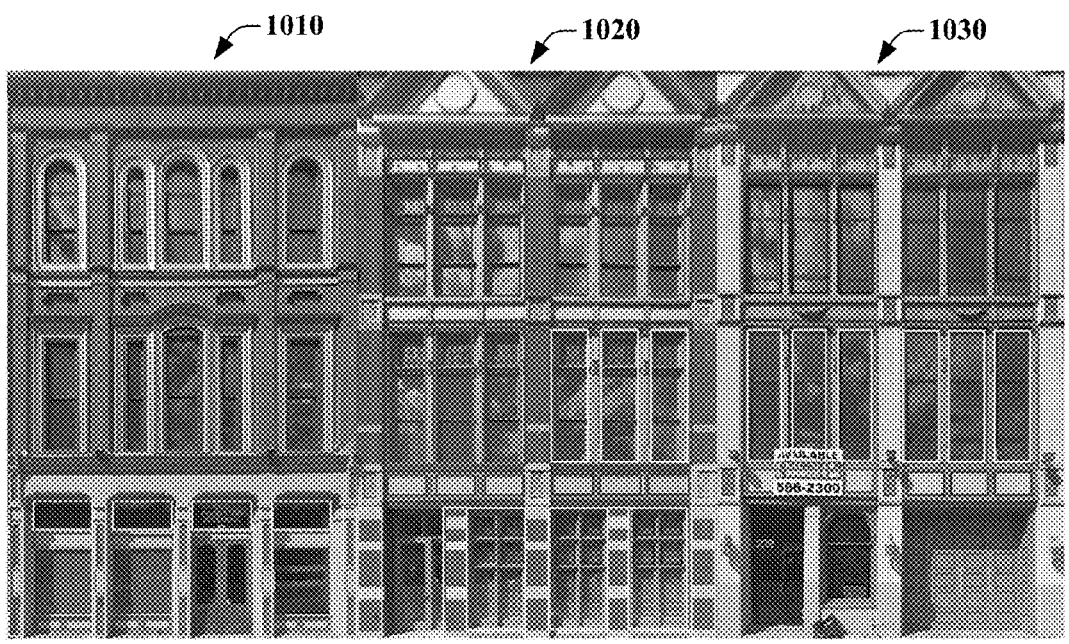
FIG. 10 illustrates an example repetitive pattern detection results including nested repetitive pattern detection.

FIG. 10 shows example repetitive detection results in various input images 1010-1030 that is the result of a composed texture from multiple views at ground level. It is noted that the methods described herein can detect nested repetitive patterns (e.g., repetitive patterns within repetitive patterns and so forth).

Figure 11:
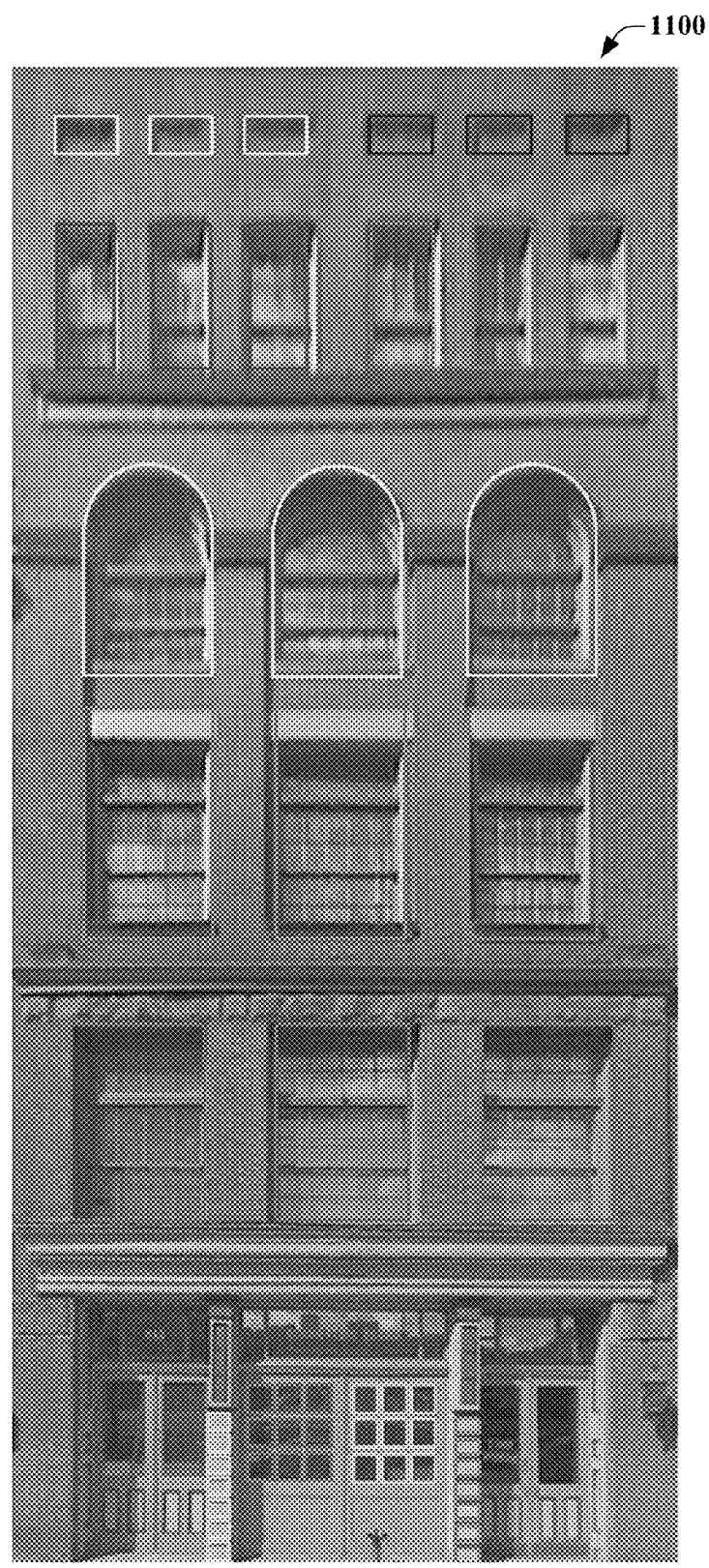
FIG. 11 illustrates an example of modeling results from composed images.
Figure 12:
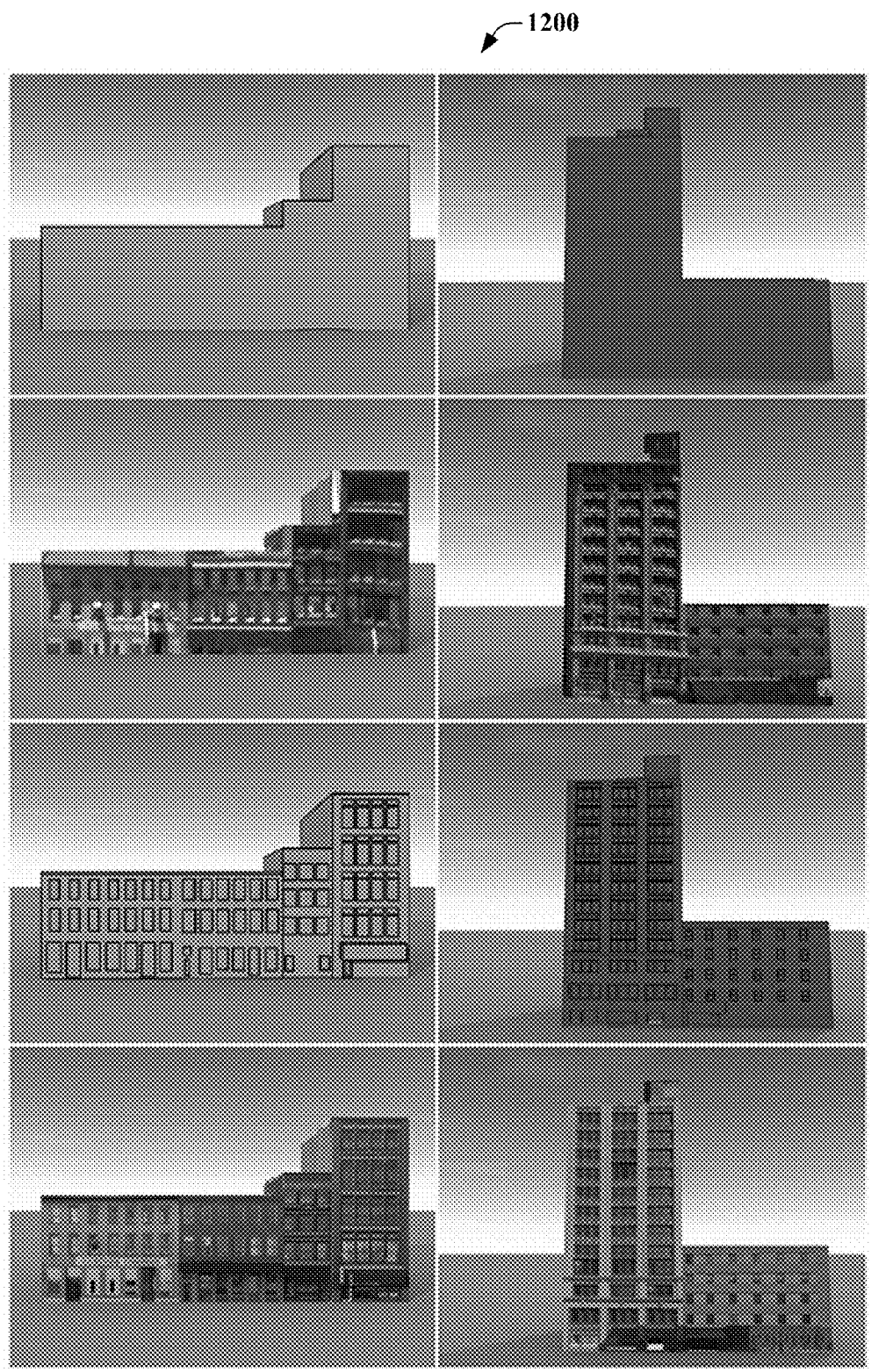
FIGS. 12-13 illustrate example modeling results for repetitive pattern detection.
Figure 13:
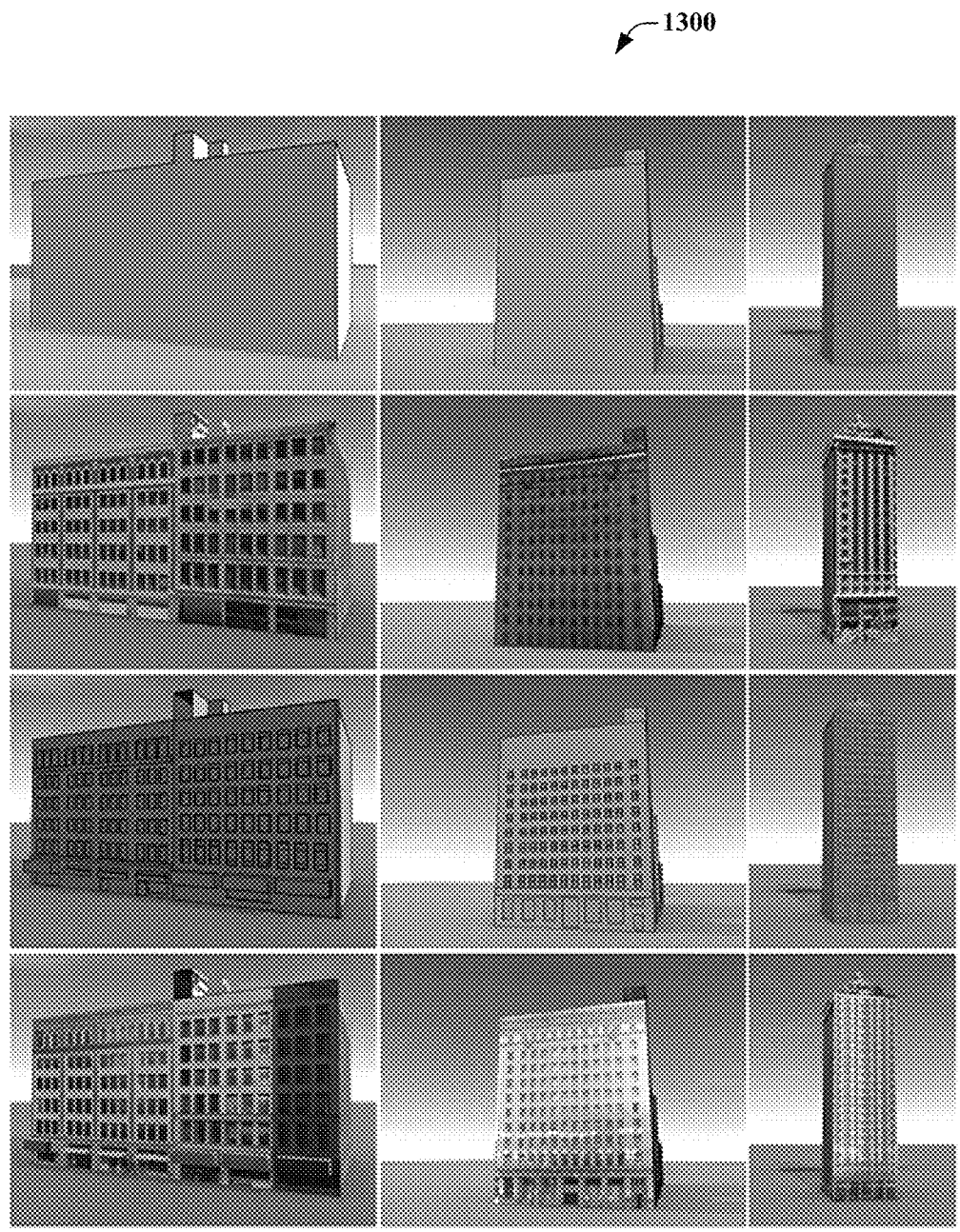

FIG. 11 illustrates another result of a composed image 1100, where types of repetitive patterns in different sizes and different shapes are detected. FIG. 12 is a collection of example images 1200 where each column represents an example. From top to bottom in the images 1200: existing approximate model, existing textured model, remodeled geometry and final result. FIG. 13 illustrates examples 1300 where each column represents an example. From top to bottom in the images 1300: existing approximate model, existing textured model, remodeled geometry and final result.

As noted above, examples in FIGS. 9, 10, and 11 include a low resolution facade texture from aerial view and the composed orthographic textures at ground level. The time complexity of repetitive pattern detection is O (mwh), where m is the number of sampling points, and w and h are the weight and height of the ortho-rectified image, respectively.

The above description relating to FIGS. 3-13 include a detection method of repetitive pattern in images. This includes employing transform space to facilitate detection of the repetitive pattern in images. There are various useful applications based on the repetitive pattern detection methods described herein. This includes automatic detection of repetitive patterns in natural and man-made objects. The method can be utilized in substantially any image processing task and other computer vision tasks. The method can also be employed to improve the performance of urban modeling systems. Such methods were tested on a typical example of the city of Pittsburgh for which both the texture of 3D models from aerial images served by e.g., Google Earth and the input images systematically captured at ground level can be analyzed. For each building, a typical size of orthographic texture image is 1000×1000 pixels. The city modeling results are demonstrated using an example facade analysis method depicted in FIGS. 12 and 13. Before proceeding, it is noted that the following description and drawings for FIGS. 14-21 relate to façade symmetry detection.

Figure 14:
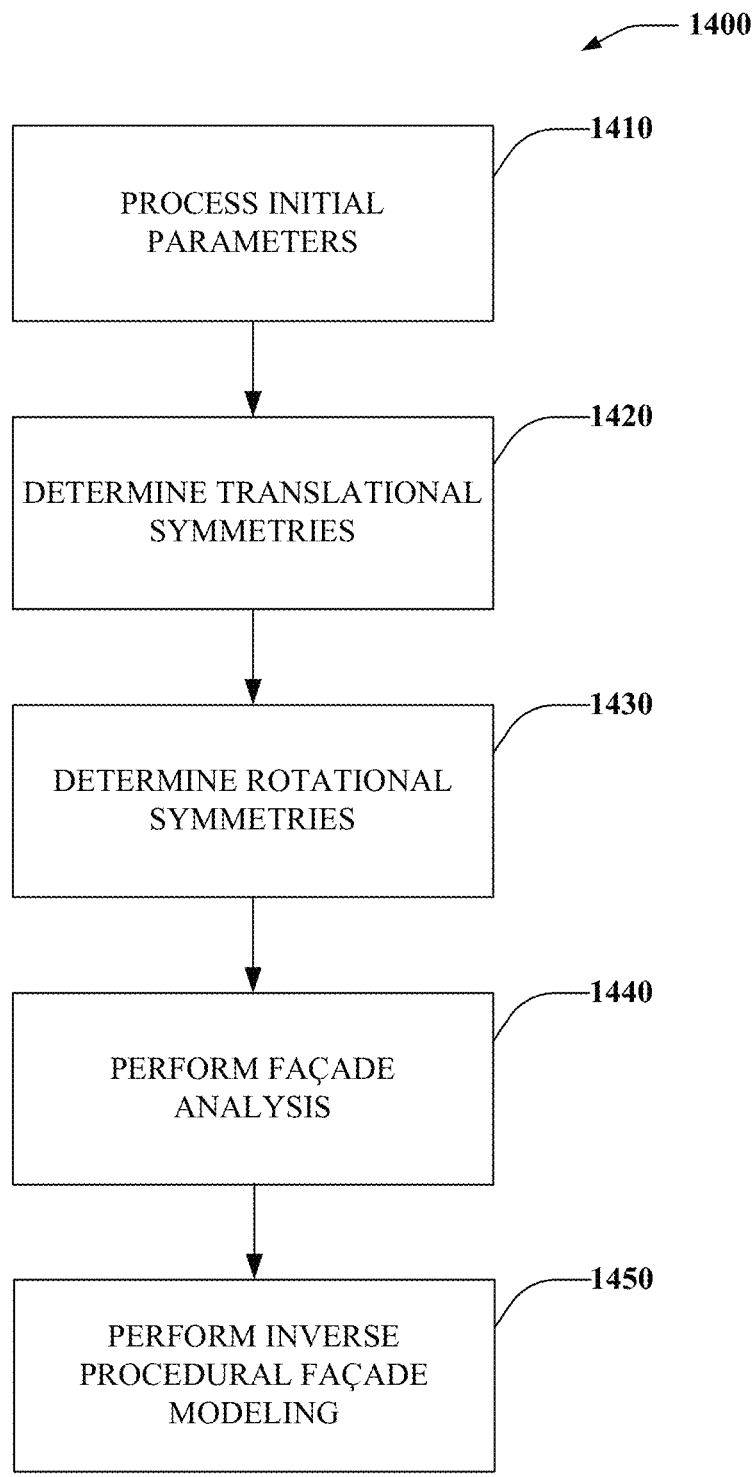
FIG. 14 is a flow chart that illustrates an example facade symmetry detection process for architectural modeling.

FIG. 14 is a flow chart that illustrates an example façade symmetry detection process 1400 for architectural modeling. At 1410, initial parameters are determined and formulated. In general, repetitive patterns occur frequently in the facades of buildings. It is known that there are various symmetry groups in the plane, which are also referred to as wallpaper groups or crystallographic groups. In the simplest instance of these symmetry groups, process the group H of translations generated by two independent translations X and Y. This is related to the fact that a group G is a symmetry group if and only if the subgroup of translations H in G is of finite index. Thus computationally, the facade symmetry detection is decomposed into at least two steps: the first is the detection of translational symmetry, the second is the discovery of intrinsic symmetries of the repeated object.

In general, any object can be transformed by the group H into an infinite array of such objects, which forms a repetitive pattern. If the object is a single point, the pattern is an array of points called a two-dimensional 'lattice.' The lines through the lattice points are two families of parallel lines, forming a 'tessellation' of congruent parallelograms filling the plane without gaps and intersects. There is generally a one-to-one correspondence between the tiles of the tessellation and the transformations in the group H, with the property that each transformation processes any point inside the original tile to a point similarly situated in the new tile. This typical parallelogram is referred to as a 'fundamental region,' wherein the shape of the fundamental region is generally not unique. The inverse problem is to rediscover such repetitive but finite patterns from a fronto-parallel view of the finite plane. More specifically, given a 2D fronto-parallel image of a building facade, detect all patterns in the image, wherein each pattern is related by:

Equation 4: $P_i = (e_0; X \times Y y)$ where the image is generated x×y times by X×Y from the fundamental region e0. Each pattern thus tessellates a finite region of the image, but different patterns may overlap in the image. One challenge is that both the patterns $P_i$ and its number p are unknown. The $P_i$ should explain the given image region, where 2D symmetry structures with respect to the 3D structures are detected, and the richer texture information of images with respect to point clouds lead to a more efficient and powerful method.

At 1420, of FIG. 14, translational symmetries are determined. Harris corners are detected in the image via sampling, where the set C, is used as seed sample points of the facade image to generate more sample points. Assume that the parameter w is the minimum distance at which to detect the repetitive pattern. For each seed sample point $si \in C$, compute a similarity map D(x; y), which is the sum of squared differences (SSD) between the patch of width w centered at the seed point si and the respective pixels of the image. Locate stationary points of the similarity map from the modes of this density map using a mean-shift method. These detected stationary points, including the seed point si, form the similarity set of points Si of the seed si are determined. This process thus generates sets $\{Si | si \in C\}$ of similar points to the seed points $si \in C$. Harris corners are suitable for seed sampling points and are rotation invariant. The detection stability also reflects the natural image scale at which to detect symmetries.

For each set Si of similar points, draw all the pairs of points (pj; pk) where pj; $pk \in Si$. Compute a translation from each pair and map it onto a 2D plane, which is the transformation space of 2D translations. The space of pair-wise transformations includes a 2D case, the space of translations is also a lattice $T_m^x T_n^y$ generated by $T_x$ and $T_y$, which is called a 'transform lattice.' The image lattice $X_x Y_y$ and transform lattice generally have the same group generators $T_x = X$ and $T_y = Y$; but the sizes may differ.

One method, if viewed as a generalized Hough Transform, processes all pairs of points as the feature space, and the group of transformations as the transform space. Instead of seeking only peak points in the transform space, a regular grid of peak points can be searched. The transform space of 2D translations is naturally represented by a 2D array as the accumulator to receive the computed translations from the pairs. The transform space is quantized in a similar manner as in the image space. Thus, identify the transform lattice of m×n with the generators $T_x \times T_y$ from such an array of accumulators. An exhaustive search method is feasible, given the simplicity of the transform space. The peak points of the accumulation array can be computed as the mode points by the mean-shift method. The ranges of m and n can be estimated. The minimum is 1, and the maximum is the largest translation in that direction divided by w. From the estimated ranges, generate possible discrete transform lattices $mi \times ni \in [1; mmax] \times [1; nmax]$.

For each transform lattice mi×ni, compute accumulated distances of the detected peak points to the lattice. The transform lattice m×n that has the smallest accumulated distance is the estimated transform lattice obtained. The set of similar points Si is now filtered by the estimated transform lattice m×n. A similar point is removed if its translation with the seed sample point is not close to any of the transform lattice points (set by a predetermined threshold). From the remaining set of similar points, compute the bounding box of the set and construct a x×y lattice in the image space. An image lattice is associated with the given seed sample point is retained if 90% (or other percentage) of similar points are on the lattice.

Each seed sample point thus yields one possible image lattice through the construction of a transform lattice. Perform the same for the seed sample points, then obtain at most |C| image lattices. These image lattices are grouped together if they are overlapping and if they have the same generators and same sizes. The image lattices having the highest numbers are considered the most likely patterns. Similar points associated with the same lattice position from the same group of image lattices are clustered into the set of similar points belonging to the same tile. A rectangular tessellation of the image region covered by the lattice is constructed by drawing horizontal and vertical lines through the centroid of the similar points of the same tile, separated by X and Y. Within a tile, process similar points as the sampling points of the object of the tile, e.g., GrabCut method to segment the foreground object out of the background wall. Then, the median of the foreground objects from different tiles is selected as the representative shape of the architecture element. An example illustrating the different symmetry detection steps is shown in FIG. 2 described above.

At 1430 of FIG. 14, rotational symmetries are determined. Patterns of rotational symmetries occur sometimes within the fundamental region of the translational symmetry, or occur locally in the facades of buildings. In the plane, the group of rotations about a fixed point generates such a pattern. For a rotation angle of n, obtain a circular pattern with rotational symmetry of order 360=n. The detection of rotational symmetries can be adapted from that of translational symmetries. It can consist of at least two steps: the first is the localization of the rotation center, the second is the determination of the rotation angle.

Start with a set of uniform random sampling points in the image region. Then, the SIFT descriptor is computed for each of the sampling points. The sampling points are then clustered to retain a few of the highest clusters to create the sets of similar sampling points. For each set of similar points, use a Hough transform to yield an estimation of the rotation center by computing a circle center of three points. The angle detection is carried out in the bounding box of similar points. This step is similar to the translational symmetry detection described above. Thus, indicate its differences with that of translational symmetries, where the set of seed sample points C contains Harris corner and SIFT points that are more redundant, but is more robust in scale variations and orientations. The similarity map $D(x; y)$ is computed at each pixel as the maximum of the SSD's computed at different angles. Compute the similarity by rotating the patch every five degrees (or other predetermined angle), and retain the best matched direction in degree d. Then, compute again by rotating the degree from d−5 to d+5. The space of pair-wise transformation is now a one-dimensional rotation angle, which is naturally accumulated in an array of 1800 (or other sized array) cells. The generating angle θ is the interval between peak points.

At 1440 of FIG. 14, facade analysis is performed. From detected repetitive patterns $P_i$, group the disjoint patterns of similar type (similar lattice and close generators) together. The distance between two disjoint symmetry patterns $P_i$ and $P_j$ of similar type is the maximum of SSDs between the segmented foreground object in each corresponding tile. Compute a distance between each pair of disjoint symmetry patterns, and consider that the pair is similar and possible to merge if the distance is less than Min ($Var(P_i)$; $Var(P_j)$), where $Var(P)$ is the variance in P. Utilize a hierarchical clustering method based on this distance to structure repetitive patterns.

In addition to the repetitive patterns $P_i$ of a facade, also search for regions that contain non-repetitive architectural objects. Thus, employ a method to detect rectangular regions in the image. One difference is that the process 1400 uses texture information in the image regions not yet covered by the repetitive patterns. All detected regions containing non-repetitive objects are merged into a hierarchy. Within each region, a Grabcut can be employed to segment the object out from the background.

In general, a facade includes a set of regions, each of which contains either repetitive patterns or non-repetitive architectural elements. Each region is generally represented by its bounding box, where the regions are merged if their bounding boxes overlap. The remaining regions of non-repetitive elements are merged by using a bottom-up merging segmentation method, based on background texture information. Thus, obtain a set of disjoint regions for the facade.

Extend each region into a structure region such that the structure regions form a partition of the facade. Thus, build up a hierarchical relationship of structure regions. The separating lines between structure regions are vertical or horizontal. First, project and accumulate the gradients of X and Y direction of the image on the horizontal and vertical axis. The accumulated values are normalized with the number of pixels along the direction of accumulation. Then, the partition process starts by dividing the image region R vertically into a set of horizontal regions $R_h$. If there is a local maximum response in the vertical direction that does not intersect structure region, the region is partitioned at this line. Finally, each horizontal region $r_h^i \in R_h$ is further partitioned horizontally into a set of vertical regions $R_v^i$. Thus, a facade layout is a set of disjoint structure regions that partitions the facade, and each structure region generally contains a set of patterns and objects.

The intrinsic symmetries of the fundamental region can be detected in each tile of the tessellation or in each region of a non-repetitive object. If the tile is large enough and it is desired to obtain patterns at a finer scale, the translational symmetry detection can be used by reducing the parameter w. The intrinsic rotational symmetries can be detected by the method of rotational symmetries presented above within a tile. Otherwise, the intrinsic rotational and reflective symmetries are detected using a correlation-based method, for example, in a typical tile or in a combined typical tile. The intrinsic symmetries of an object facilitate the recognition of the object are now described.

Each detected pattern and object can be recognized from a database of architectural elements T, in which each template t ∈ T has a Type (windows or doors for instances), real size, and a detailed 3D geometric model. The templates of the database are non-parametric, so it is straight-forward for users to build a database and re-use existing models. Before recognition, each 3D template is orthographically projected into a 2D template, which is smoothed by a Gaussian kernel whose size is set to one tenth (or other fraction) of the size of the 3D model. For an image object $r_{sa}$, align it with each 2D template using bounding boxes, then a distance between the object $r_{sa}$ and a template st is defined to be Equation 5:

$$D(s_t, r_{sa}) = D_e(s_t, r_{sa}) + \beta \frac{D_b(s_t, r_{sa})}{B(s_t)}$$

where $D_e(s_t; r_{sa})$ is the accumulated Gradient differences in the intersection region and $D_b(s_t; r_{sa}) = s_t \cup r_{sa} - s_t \cap r_{sa}$ is the accumulated differences of the binary mask of $s_t$ and $r_{sa}$, and $B(s_t)$ is the length of the boundary of st measured in pixels. Finally, the object matches the template if the distance is the smallest for the templates.

The position of the recognized template t is snapped to the nearest and the strongest edge points in the neighborhood. In addition to the patterns and objects, the separating lines of the structure regions often indicate architectural separators, which should be detected and recognized. Thus, in the neighborhood of each separating line, search for an elongated horizontal or vertical bar in the database as the architectural separators.

At 1450 of FIG. 14, inverse procedural facade modeling is performed to facilitate architectural modeling. After the modeling of an actual facade, an inverse procedural modeling of synthetical facades is provided where a Computer Generated Architecture ("CGA") shape grammar represents a facade with contain rules. Then, the procedural rules of the facade model are learned in images. Finally, to prove the expressiveness of the grammar rules, a synthesis method is developed to generate a synthetic facade 3D model based on the extracted rules from images.

A grammar is denoted as G=(S; R), where S is the set of symbols and R is a set of production rules. A symbol s in S is either in the set of terminal symbol V or in the set of non-terminal symbol E, where V ∩ E=θ and V ∪ E=S. Each symbol, terminal or non-terminal, is a geometry shape with geometric and numeric attributes. In one example, CGA shape can be employed as a basic grammar system. In this manner, a production rule can be defined as Equation 6:

id:predecessor→cond:successor:prob where id is the unique identifier of the rule, predecessor ∈ E is a symbol identifying a shape that is to be replaced with successor, and cond is a flag to indicate that the rule is selected with probability prob and applied if it is true.

A facade is generated from a given string str consisting of the symbols in S. An active shape P is selected from str and a production rule L with P on the left hand side is also selected. Then the string Q on the right hand side of L substitutes P as the successor. Also, Q is left active and P inactive. This process runs recursively until the string str contains no more non-terminals. A priority is assigned to each rule to induce more controls on the production, thus select the shape replacement with the rule of highest priority. Note, in CGA shape, when a shape is replaced, it is not deleted, but marked as inactive.

A general contain rule specifies an object is containing other objects by Equation 7:

$$s \rightarrow \text{Contain}(\text{Num}, r_0, \ldots, r_{Num-1})\{c_0, \ldots, c_{Num-1}\};$$

where Num is the number of components in s, $c_x$ is a shape symbol in S and $r_x$ is the placement configuration of the component $c_x$. It generally does not have constraints on how many ascending and descending shapes there are. The $r_x$ can be further defined as $r_x$=(dim; $bound_x$; $vis_x$; $op_x$) where boundx is the bounding box of the region $r_x$ in dim-dimensional space. To define the relationship between sibling nodes $c_x$, define the priority for the visibility of $c_x$ as an integer $vis_x$, where a larger value indicates higher priority for the visibility. In addition, $op_x$ is introduced to define the interaction between node $c_x$ with other sibling nodes $\{c_i | vis_i < vis_x\}$, e.g., overlaying and 3D Boolean operations.

A general contain rule can be specialized to a repetitive contain rule, which generates repetitive components. The repetitive contain rule can be defined as Equation 8: s→Repeat(DIR; step; times; $r_x$){$c_x$}; where DIR can be "X", "Y", "Z", "XY", "XZ", "Y Z", or "XY Z" to specify the direction of the repetitive pattern, step is a vector for steps in different directions, times is a vector for numbers of repetition in each direction, rx is the initial region, and cx is the repetitive shape.

A subdivision technique defined by split rules is used to augment geometry details. However, split rules shows its limitation in two aspects: it often over-partitions a facade, and the geometry generated geometry is not unique. More complex analysis may be needed to consolidate the inconsistent splitting grammars extracted from images. There is generally no mechanism for interactions between sibling symbols generated by split rules. For contain rules, first, the positions and regions of descending shapes are explicitly defined. Hence, no splitting is generally required to gradually subdivide the ascending shapes. Secondly, users can define properties that are shared by descending shapes. Thirdly, they are able to be extracted from bottom-up and/or top-down analysis.

The facade analysis produces a layout that is a set of disjoint structure regions in rectangular shape. The layout decomposed the input image into a few horizontal structure regions each of which contains a few vertical structure regions, where each vertical structure region generally contains a region of objects. The literal description above shows that the decomposition of a facade f can be naturally represented by a contain rule for a structure region of non-repetitive elements, and by a repeat rule for a structure region of repetitive patterns such as Equation 9:

$$f \rightarrow \text{Contain}(|R_h|, r_h^0, \ldots, r_h^{|Rh|-1})\{r_h^0, \ldots, r_h^{|Rh|-1}\}$$

Then, for each $r_h^i$, Equation 10:

$$r_h^i \rightarrow \text{Contain}(|R_v^i|, r_h^{i,0}, \ldots, r_h^{i,|Rvi|-1}) \\ \{r_v^{i,0}, \ldots, r_v^{i,|Rvi|-1}\}$$

Finally, for each $r_v^{i,j}$, use a rule to contain its structure elements and background region if they exist.

The synthetical facade should preserve as much as possible the architectural characteristics of the original facade. First generate a layout, then synthesize its texture region-by-region. Given a user-specified region, generate a layout for the synthetical region from the original layout of a real facade described by the rules. A layout is recursively a horizontal or a vertical partition, thus process it as a horizontal partition without loss of generality. Use at least three heuristic rules to generate the synthetical layout to:

Copy the original layout proportionally.

Copy the original layout by successively replacing the largest (or the smallest) structure region so far by a multiple of that structure region if possible.

Copy the original layout by randomly fixing some regions and replacing some others by a multiple of them.

The remainder region modulo associated with the above operations, if any, is distributed to the largest structure region. After the global layout, fill in a synthetical structure region from an original structure region, and repeat proportionally each original pattern and object if they do not generate conflicting overlapped objects. If the synthesized patterns are overlapped, select the largest pattern and remove the smaller ones.

Given an original exemplar region $R_e$ with layout $L_{ai}$ and a synthetical layout $L_{as}$, synthesize the texture of the region $R_s$. Consider the one dimensional horizontal case then extend to the general case. When the length of the synthesized region $l_{rs}$ is less than that of the original region $l_{ro}$, it is a shrinking operation. When $l_{rs}$ is larger than lro, it is an extension operation. For a horizontal exemplar region $R_{he}$, partition the region with vertical boundaries of the bounding boxes of objects. The area between two neighboring objects $S_x$ and $S_y$, is the buffer region $Br_{xy}$. For each pixel position t on the top of the strip and each pixel position b on the bottom of the strip, compute a separating path $c_b^t$. Pre-compute paths for the possible combination of pixel positions. Each path $c_b^t$ separates the buffer Br into $Br_{left}$ and $Br_{right}$. One goal is to determine the cut position x and the connecting position y to shrink the original region.

Each possible x deduces a finite set of possible connectors y such that $Br_{leftx} + Br_{righty} = l_{rs}$. Process possible x and y variables, and possible paths $c_b^t$. A possible position v with cut c divides the buffer region into $Br_v^{left}$ and $Br_v^{right}$, the cost of division is measured by Equation 11:

$$E_c(c) \sum_{p_\upsilon \in c} E_l(p_\upsilon) \left( \alpha + \frac{1}{\max(HoG(p_\upsilon))} \right)$$

where $E_l(p_\upsilon)$ is the sum of horizontal and vertical gradient at $p_\upsilon$, HoG ($p_\upsilon$) is the histogram of oriented gradients at each pixel and alpha is the control factor. Here, the gradient is computed at the combined image of $Br_{xy}^a$ and $Br_\upsilon^b$ with cv as boundary. The v with the minimum score is selected as the cutting position x and the connecting position y. The time complexity is $O(l_{rs}^2 \times \Sigma_{i=0}^{nb} l_i)$ where nb is the number of buffer regions.

An extension operation is similar as in the shrinking operation that search for x and y, but the restriction changes to search for the pair that extend current buffer length. Now, the operation should be repeated until it at least reaches the required synthetical size. For the possible spill-over, the shrink operation should be run to obtain the required size. For a regular 2D layout, the synthesis can be obtained by a horizontal synthesis followed by a vertical synthesis or vice versa. If the cut may goes through an object, then partition the region containing the object into smaller and non-overlapping sub-regions in which the synthesis is carried out hierarchically such that the cuts will not cross the objects.

For a typical image size of 1000×1000, the symmetry detection takes in average about one hour. The 85% of time spent for symmetry detection, is the computation of the similarity map. In practice, the detection algorithm can be run on a down-sampled image of size of 350×350, which takes about 15 minutes for detection. When the clustered similar points are obtained from the down-sampled image, proceed back to the image of the original size for the subsequent computation. For each image, first roughly estimate a size scale in meters as an input parameter. Then, fix the parameters w to default values of 1.5 meters, for example, (or other number) and the quantized unit of transform space to 0.3 meter, for example.

Figure 15:
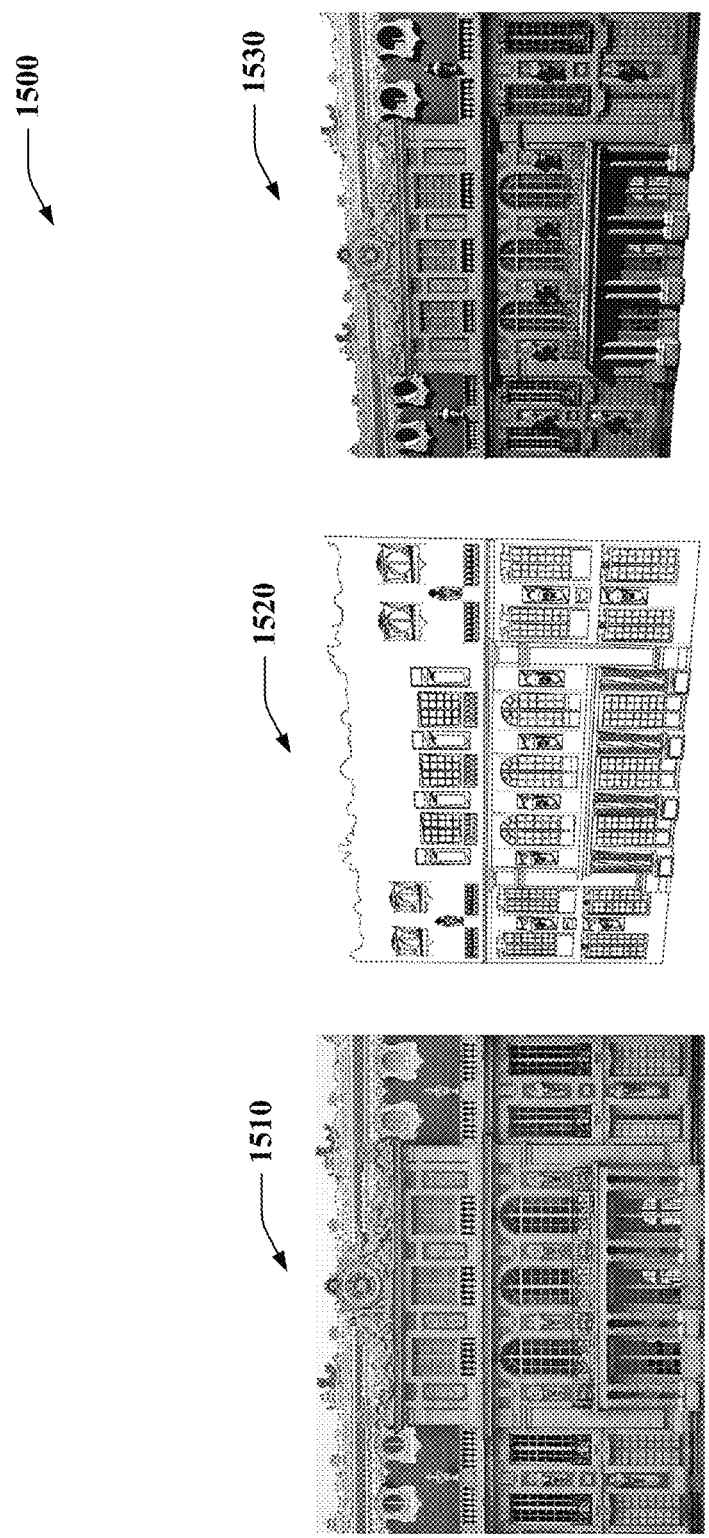
FIGS. 15-21 illustrate various examples of facade symmetry detection for architectural modeling.

An image of Palais de Versailles is shown in FIG. 15 at 1500 and is 2158×1682. Both the hierarchical symmetries and the boundaries between different neighboring symmetry patterns are detected. At 1510, an input image is shown. At 1520, a 3D geometry model is shown, and at 1530, a textured 3D model is shown.

Figure 16:
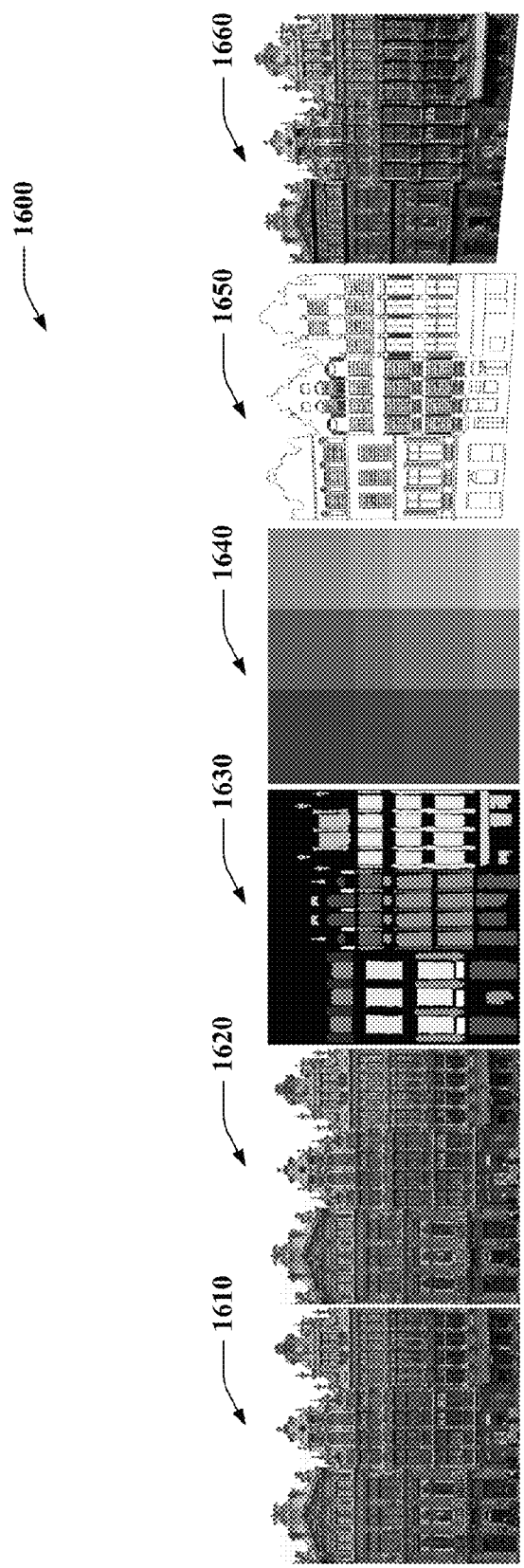

A Brussels example 1600 in FIG. 16 is of resolution 1036× 1021 and has multiple facades. At 1610, an example input image is shown. At 1620, clustering of repetitive patterns is illustrated. At 1630, detection of repetitive patterns and non-repetitive elements is shown. At 1640, an example façade layout is shown. At 1650, a 3d geometry model is shown and at 1660, a textured 3D model is shown.

Figure 17:
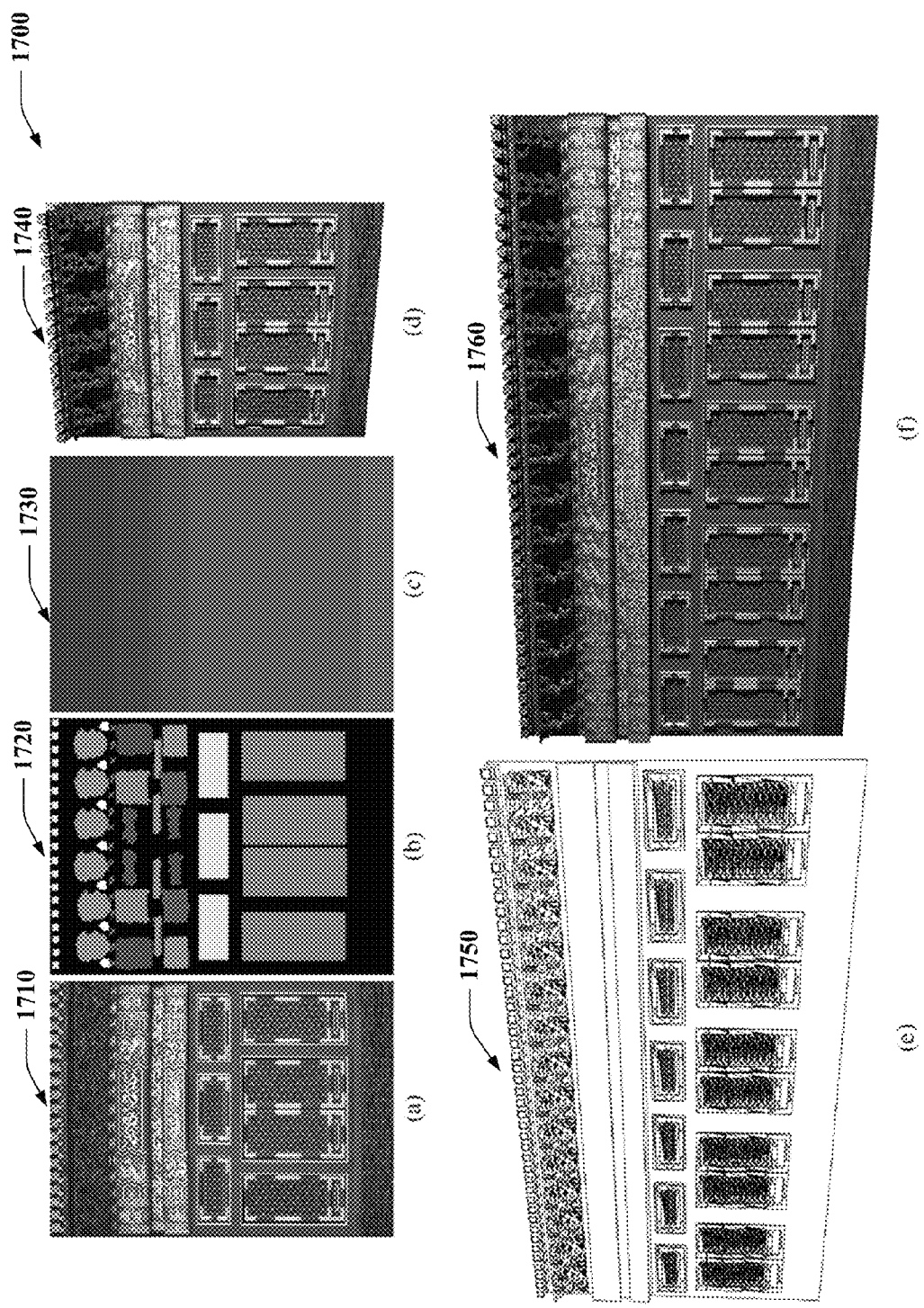

A Beijing example 1700 is shown in FIG. 17 of size 844× 1129 and contains repetitive patterns in small scales. At 1710, an input image is shown. At 1720, symmetry detection is illustrated. At 1730, a façade layout is shown. At 1740, a textured 3D model is shown. At 1750, a synthetical 3D geometry model is shown and at 1760, a textured synthetical 3D model is illustrated.

Figure 18:
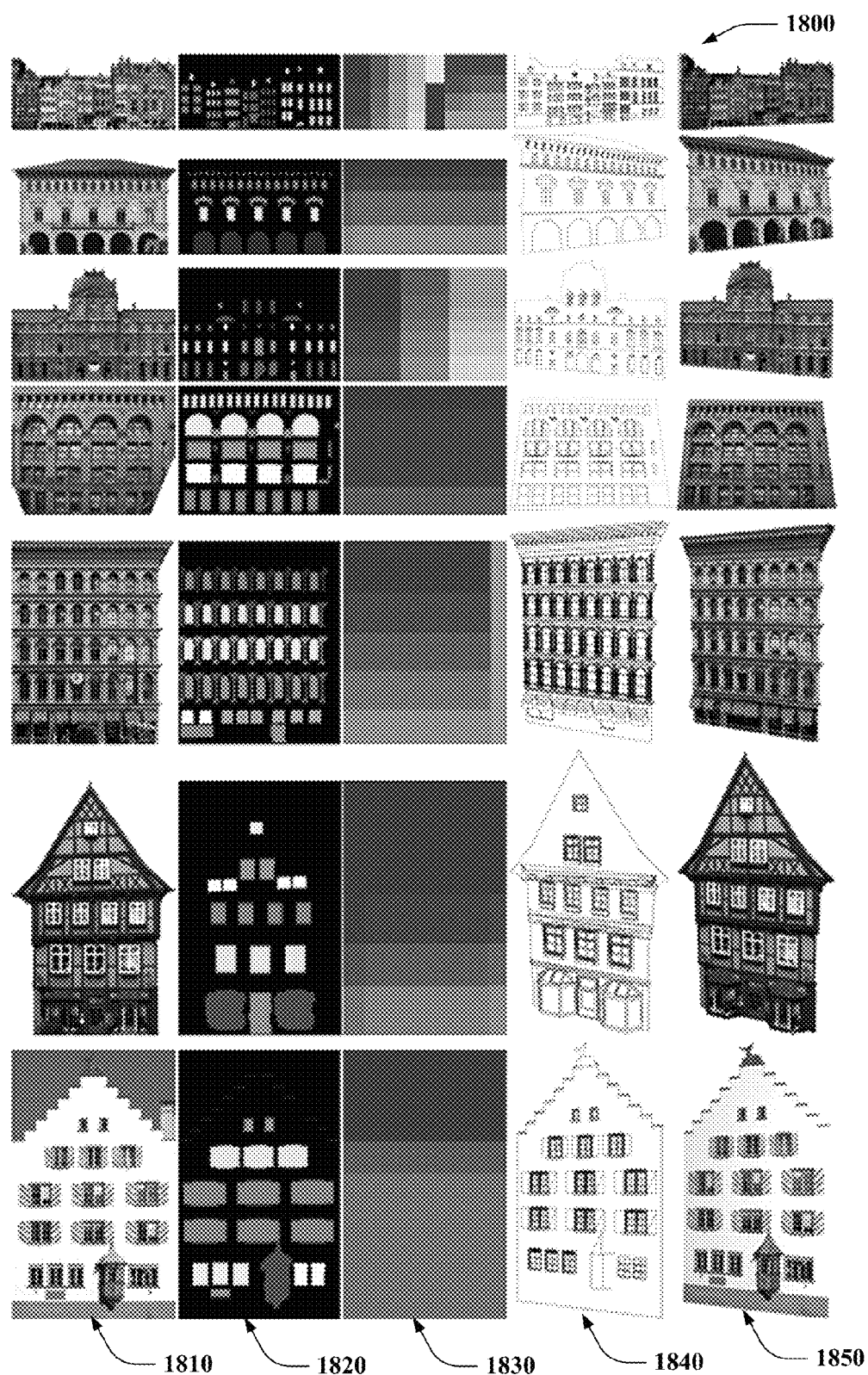

Other representative examples are shown at 1800 of FIG. 18. All results are automatically computed. The first column at 1810 shows example input images followed by the second column at 1820 which shows symmetry detection. The column at 1830 shows a façade layout whereas the column at 1840 shows a 3D symmetry model followed by column 1850 which is textured 3D models.

Figure 19:
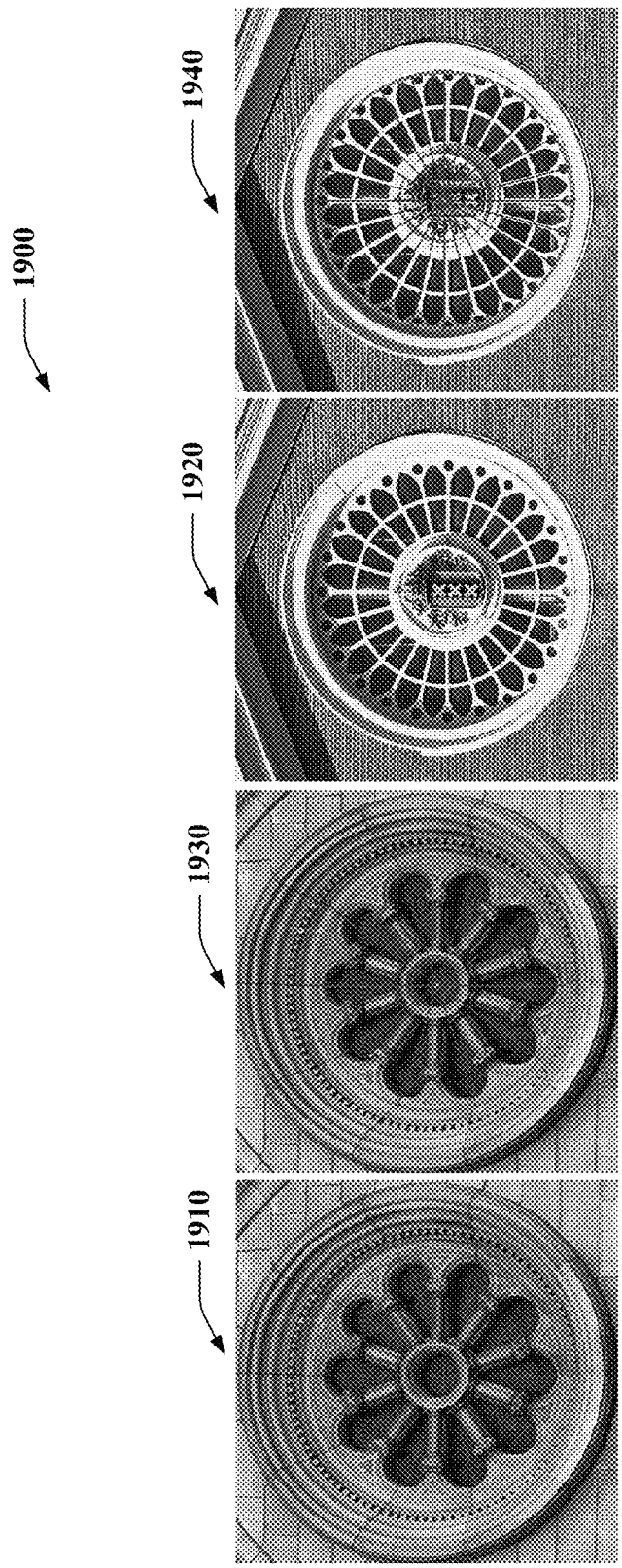
Figure 20:
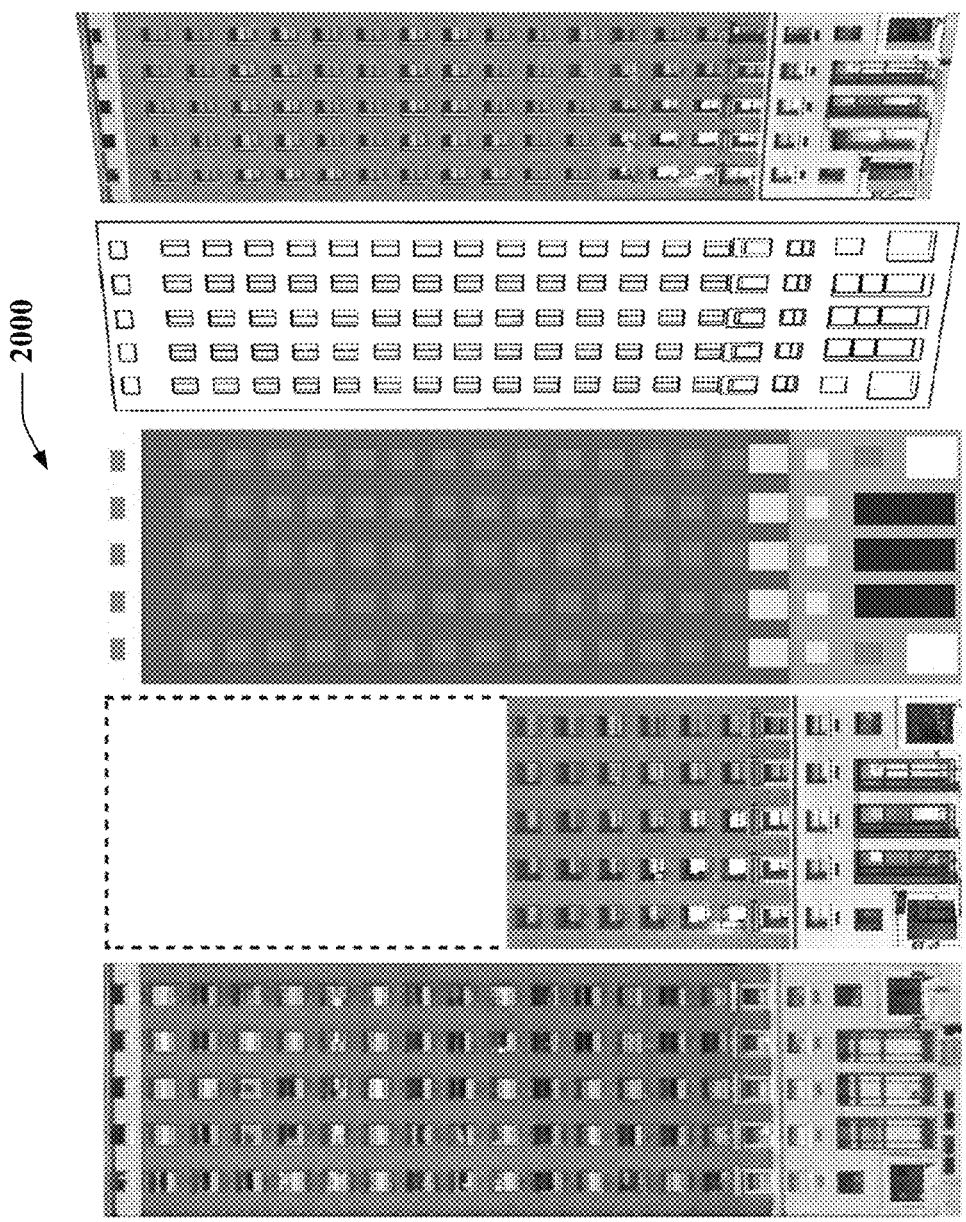
Figure 21:
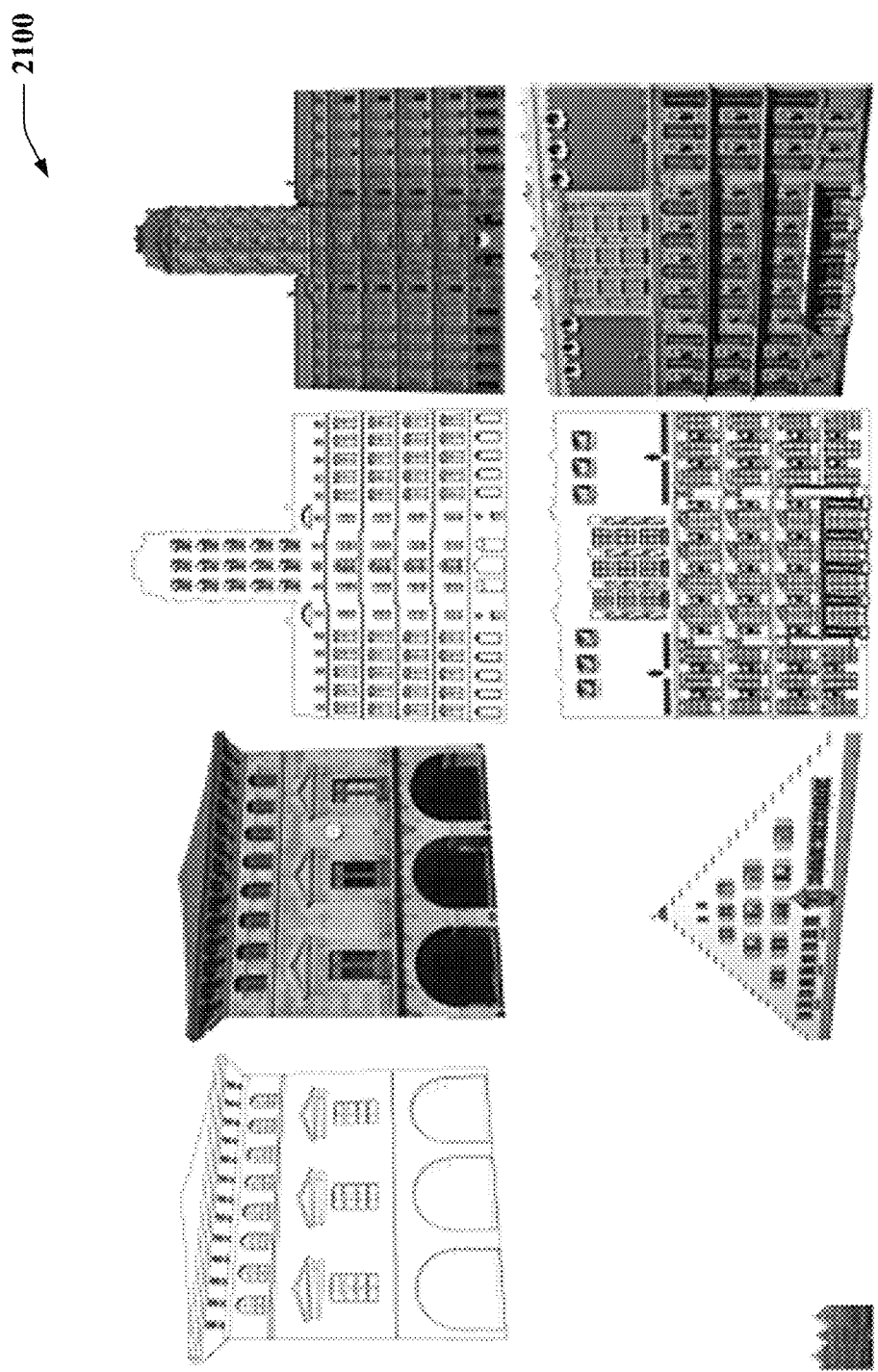

FIG. 19 shows rotational symmetry examples 1900, where an input image is shown at 1910 and 1920, and rotational symmetry detection is illustrated at 1930 and 1940.

TABLE 1

The performance is categorized into three groups by the repeated times of a repetitive pattern $N_c$. The detection perform the best for larger $N_c$ thanks to a more reliable voting in the transform space.

|  | $N_c > 10$ | $3 <= N_c <= 10$ | $N_c = 2$ | Overall |
|---|---|---|---|---|
| $Er_d$ | 91.4% | 86.8% | 67.2% | 83.7% |
| $Er_c$ | 93.3% | 87.1% | 84.2% | 88.9% |

TABLE 2

The detection correctness for three kinds of symmetries. Translational symmetries are the most robust, and the rotational ones are the weakest, which is due to the increased complexity and difficulty in seeking rotation-invariant similarity.

|  | Translation | Rotation | Hierarchical |
|---|---|---|---|
| $Er_c$ | 89.2% | 83.5% | 80.2% |

In general, define the detection rate $E_{rd}$ as the number of discovered repetitive patterns over the number of all repetitive patterns, the ground truth number is counted by inspection of the images. Define the accuracy rate of detection $E_{rc}$ as the number of correctly discovered patterns over the number of all discovered patterns. The overall $E_{rd}$ and $E_{rc}$ are 83.7% and 88.9%, for example. For tile segmentation, the method used 20 ground truth segmentations, for example, where the overall pixel accuracy was 90.2%, for example.

In the one example, a database of about 300 architectural objects was created. The detection rate of non-repetitive objects for real Facade modeling is about 76.1%, for example. The subject symmetry detection method avoids over-partitions and is convertible into general contain rules. An example façade analysis is shown at 2000 of FIG. 20.

An example symmetry detection process typically lasts about 5 minutes for a region of 1000×1000. The parameter used in the energy function is by default set to 0.5, for example. Some representative synthetic facade examples are shown at 2100 in FIG. 21, in which examples of shrinking, extension, and that the original characteristics of Facades are well preserved. The rules can also be employed to process hidden portions of a tall-rise building, for example. In the example given in FIG. 20, rules can be merged from two (or more) different images of the same building in order to generate the complete model of the Facade.

Figure 22:
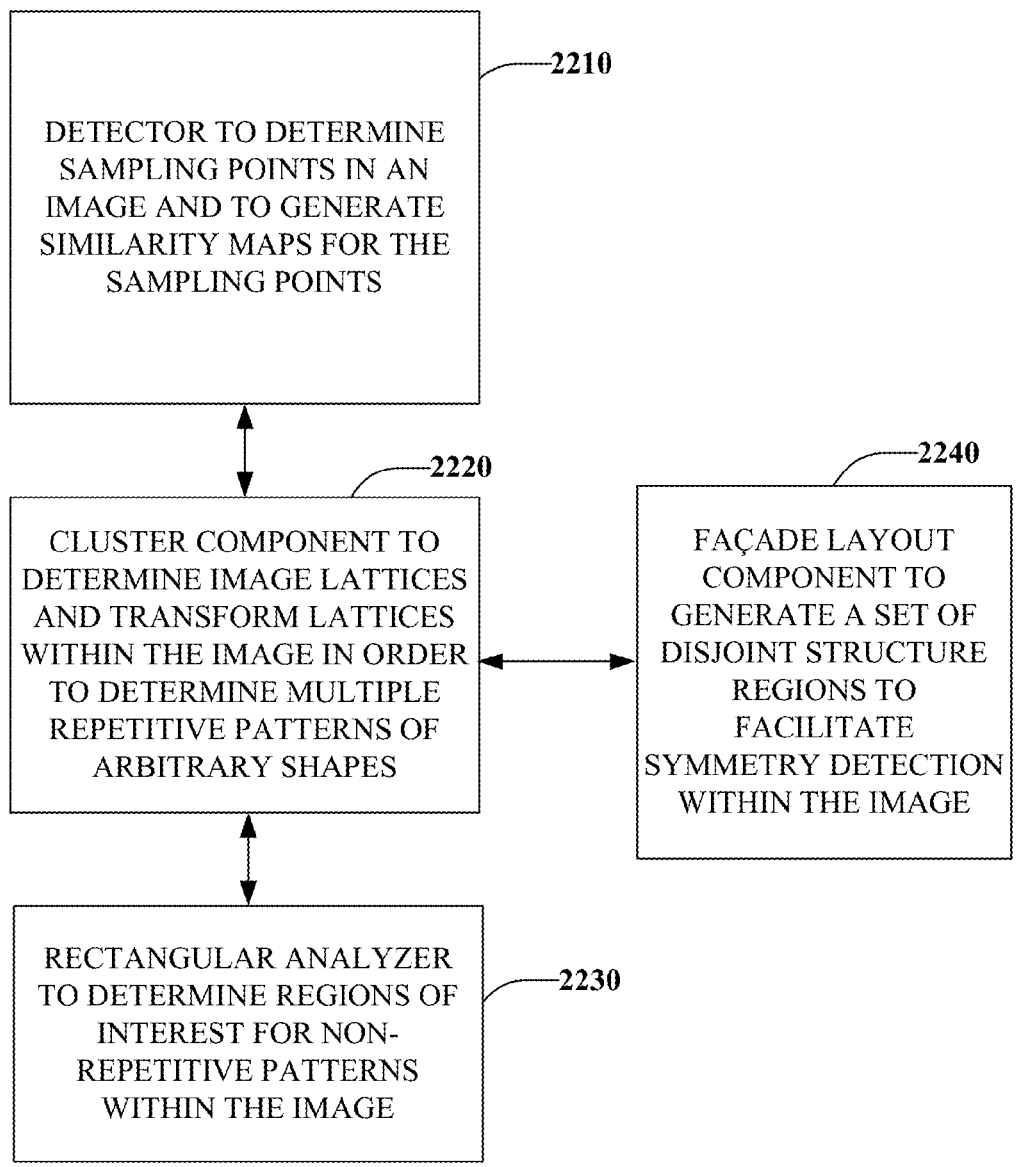
FIG. 22 illustrates an example facade symmetry detection system for architectural modeling.

FIG. 22 illustrates an example modeling system 2200 for generating modeled images of buildings or other structures and shapes via symmetry detection. The system 2200 includes a detector 2210 to determine sampling points in an image and to generate similarity maps for the sampling points. This includes a cluster component 220 to determine image lattices and transform lattices within the image in order to determine multiple repetitive patterns of arbitrary shapes. A rectangular analyzer 2230 determines regions of interest for non-repetitive patterns within the image and a façade layout component 2240 generates a set of disjoint structure regions to facilitate symmetry detection within the image.

Other aspects that are not illustrated yet can be included with the modeling system 2200 include a translation symmetry component to determine one or more sample points in an image to facilitate the symmetry detection within the image, wherein the translation symmetry component includes a clustering component to yield one or more potential image lattices via construction of a transform lattice operating on the one or more sample points within the image. A tessellation component determines similarity points associated with a lattice, wherein the similarity points are employed to construct horizontal and vertical lines through centroids associated with the sample points within the image. A rotational symmetry component determines regions of translational symmetry that occur locally in facades of buildings, wherein the rotational symmetry component determines a rotation center and a rotation angle to determine the regions of translational symmetry.

A façade analysis component determines repetitive patterns and non-repetitive objects within a façade, wherein the repetitive patterns are determined via distances between disjoint symmetry patterns and the non-repetitive objects are determined by analyzing texture information from image regions that are not associated with the repetitive patterns. One or more grammar rules can be provided with the system 2200 to facilitate automatic generation of a façade, wherein the grammar rules are associated with a computer generated architecture ("CGA") shape to facilitate symmetry detection within the image. This can include one or more contain rules that define which patterns or shapes are included within an area defined as a building façade. This also can include one or more heuristic rules that define a synthetical layout for the building façade, wherein the heuristic rules are associated with copying an original layout proportion, replacing structural regions by a multiple of a determined structural region, or copying an original façade layout by randomly adjusting one or more regions within the façade layout.

Figure 23:
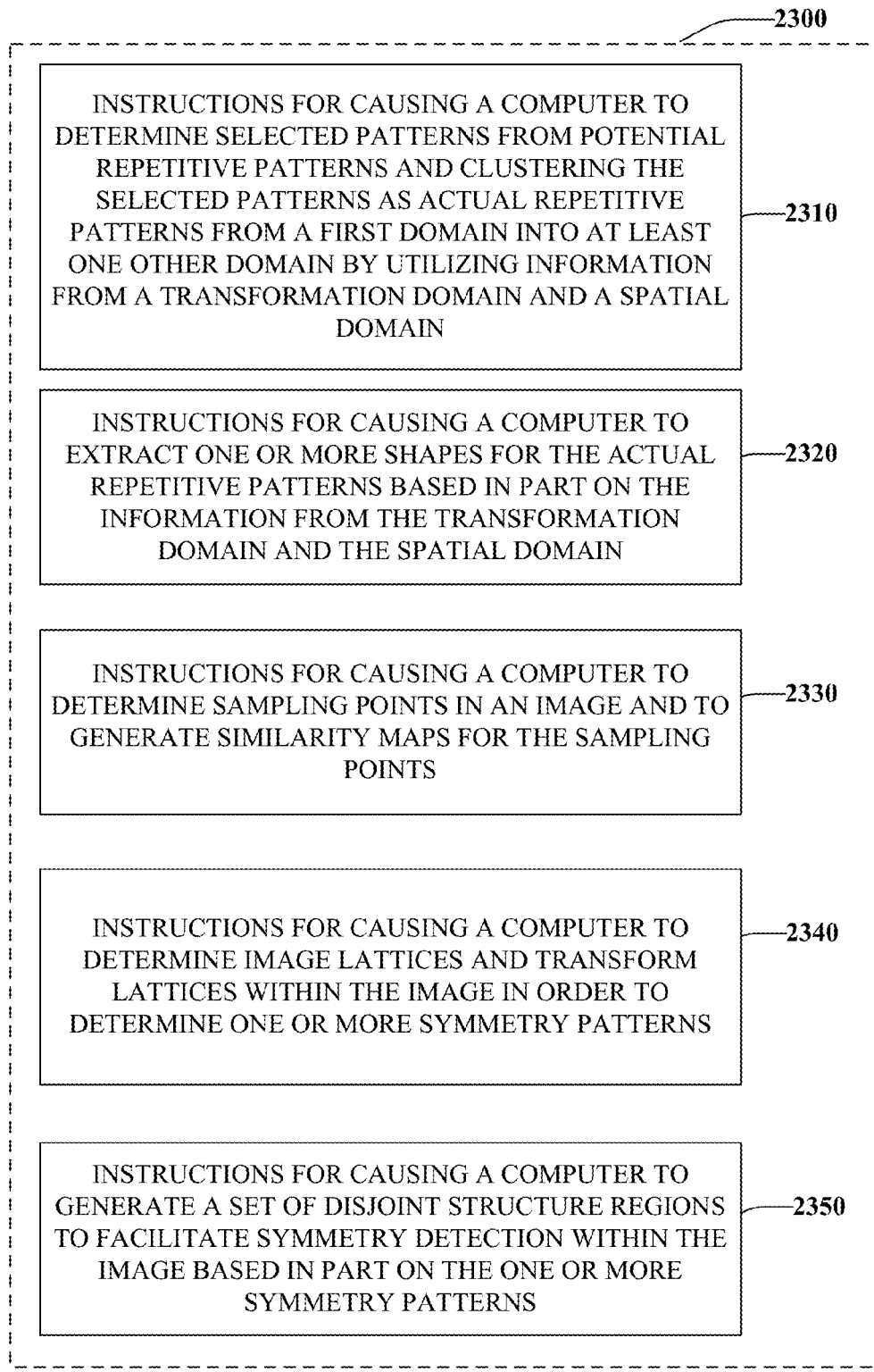
FIG. 23 illustrates an example computer-readable medium of instructions for causing a computer to generate modeled images of buildings or other structures employing repetitive pattern and symmetry detection.

FIG. 23 illustrates an example computer-readable medium 2300 of instructions for causing a computer to generate modeled images of buildings or other structures employing repetitive pattern and symmetry detection. The computer-readable medium 2300 includes instructions 2310 for causing a computer to determine selected patterns from potential repetitive patterns and clustering the selected patterns as actual repetitive patterns from a first domain into at least one other domain by utilizing information from a transformation domain and a spatial domain. This includes instructions 2320 for causing a computer to extract one or more shapes for the actual repetitive patterns based in part on the information from the transformation domain and the spatial domain. This also includes instructions 2330 for causing a computer to determine sampling points in an image and to generate similarity maps for the sampling points. Another aspect includes instructions 2340 for causing a computer to determine image lattices and transform lattices within the image in order to determine one or more symmetry patterns. This also includes instructions 2350 for causing a computer to generate a set of disjoint structure regions to facilitate symmetry detection within the image based in part on the one or more symmetry patterns. The computer-readable medium can also include instructions for causing a computer to determine regions of interest for non-repetitive patterns within the image, wherein the instructions include one or more translational symmetries and one or rotational symmetries to determine the non-repetitive patterns.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods that provide advantages of the subject innovation. It is, of course, not possible to describe every conceivable combination of components or methodologies for purposes of describing the claimed subject matter, but one of ordinary skill in the art may recognize that many further combinations and permutations of the various embodiments described herein are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
extracting, by a system comprising a processor, a set of initial sample portions of an image, wherein the set of sample portions comprises a set of grid information, a set of image space information and a set of lattice information associated with the image;
generating, by the system, a set of similarity maps representing similar image elements between the initial sample portions of the set of initial sample portions, wherein the set of similarity maps is based on at least one similarity measurement;
selecting, by the system, a set of repetitive patterns and a set of architectural objects from the set of initial sample portions, wherein the set of repetitive patterns is selected based on the set of similarity maps;
clustering, by the system, subsets of repetitive patterns of the set of repetitive patterns and architectural objects into aggregated repetitive pattern groups based on a set of procedural modeling rules, wherein the aggregated repetitive pattern groups represent a shape, an architectural element, or a structure of a synthetic façade model; and
matching, by the system, the aggregated repetitive pattern groups to architectural objects of a data store corresponding to a synthetic facade model template.

2. The method of claim 1, further comprising determining, by the system, a distance between data points, wherein the data points represent a repetitive pattern of the subset of repetitive patterns, and wherein the determining is based on a first procedural modeling rule of the set of procedural modeling rules.

3. The method of claim 2, wherein the clustering is based on the distance between the data points.

4. The method of claim 2, wherein the set of procedural modeling rules comprise a second procedural modeling rule to facilitate determining a distance between data points, wherein the data points represent an aggregate repetitive pattern group of the aggregated repetitive pattern groups, a third procedural modeling rule to facilitate detection of a rotation symmetry and a symmetry pattern from the image, a fourth procedural modeling rule to facilitate detection of a façade structure corresponding to the image, and a fifth procedural modeling rule to facilitate detection of a repetitive window corresponding to the images.

5. The method of claim 1, wherein an architectural object of the set of architectural objects is a of foreground object of the image.

6. The method of claim 1, further comprising determining, by the system, distances between data points, wherein the data points respectively correspond to subsets of lattice information of the set of lattice information.

7. The method of claim 5, further comprising determining, by the system, a set of repetitive patterns based on a shape of the foreground object.

8. The method of claim 1, further comprising determining, by the system, a centroid of subsets of grid information of the set of grid information to facilitate the selecting the set of repetitive patterns.

9. The method of claim 8, wherein the matching is based on respective scores corresponding to the aggregated repetitive patterns groups, wherein the respective scores represent respective degrees of similarity of the aggregated repetitive pattern groups to the synthetic facade model template.

10. A system, comprising:
a memory having stored thereon executable components; and
a processor configured to execute or facilitate execution of the executable components, comprising:
a first extraction component that extracts initial sample portions of a set of grid information, a set of image space information and a set of lattice information associated with one or more images;
a determination component that determines a set of symmetry patterns between the set of grid information, the set of image space information, and the set of lattice information wherein the determining is based on a set of similarity maps corresponding to sample data points of the initial sample portions;
a selection component that selects a set of repetitive patterns from the initial sample portions based on the set of symmetry patterns;
a clustering component that clusters subsets of the set of repetitive patterns into aggregated repetitive pattern groups based on a set of procedural modeling rules, wherein the repetitive pattern groups represent at least one of a shape, an architectural element, or a structure of a synthetic façade model;
a second extraction component that extracts one or more shapes from the aggregated repetitive pattern groups; and
a generation component that generates a synthetic facade model based on an arrangement of the one or more shapes within the synthetic facade model template.

11. The system of claim 10, wherein the executable components further comprise another determination component that determines distances between data points corresponding to the subsets of repetitive patterns based on the set of procedural modeling rules.

12. The system of claim 11, wherein the clustering component clusters the subsets of repetitive patterns based on the distances between the data points.

13. The system of claim 10, wherein the selection component selects the one or more shapes from a foreground object of the one or more images.

14. The system of claim 13, wherein the determination component selects the one or more shapes of the foreground object based on a distance between data points representing the set of lattice information.

15. The system of claim 10, wherein the determination component determines a centroid of a subset of grid information of the set of grid information to facilitate selecting the set of repetitive patterns by the selection component.

16. A non-transitory computer-readable medium having instructions stored thereon that, in response to execution, cause a system comprising a processor to perform operations, comprising:
extracting initial image samples from a set of images, wherein the initial image samples comprise a set of grid information represented by a set of image space data points and a set of lattice information represented by a set of transformation modeling data points;
determining correlations between the set of image space data points and the set of transformation modeling data points;
selecting repetitive patterns from the initial image samples based on the correlations between a subset of image space data points of the set of image space data points and a subset of transformation modeling data points of the set of transformation modeling data points;

clustering the repetitive patterns into aggregated pattern groups based on a set of transformation modeling rules, wherein the repetitive pattern groups represent at least one of a shape, an architectural element, or a structure of a synthetic facade model;

extracting one or more shapes from the aggregated repetitive pattern groups; and assigning respective scores to the one or more shapes based on respective levels of similarity of the one or more shapes to architectural objects of a data store corresponding to a synthetic facade model template.

17. The non-transitory computer readable medium of claim 16, the operations further comprising matching the aggregated repetitive pattern groups to the synthetic facade model template based on the respective scores.

18. The non-transitory computer readable medium of claim 17, the operations further comprising generating the synthetic facade model based on the matching.

19. The non-transitory computer readable medium of claim 16, the operations further comprising estimating a shape of a foreground object of the synthetic facade model based on the set of transformation modeling rules.

20. The non-transitory computer readable medium of claim 16, the operations further comprising pairing a subset of the set of grid information to a subset of lattice information of the set of lattice information based on the correlations between the subset of the image space data points and the subset of the transformation modeling data points.

* * * * *